(12) United States Patent
Zhou

(10) Patent No.: US 12,242,000 B2
(45) Date of Patent: Mar. 4, 2025

(54) DISTANCE MEASURING DEVICE AND SWEEPING ROBOT

(71) Applicant: SHENZHEN CAMSENSE TECHNOLOGIES CO., LTD, Guangdong (CN)

(72) Inventor: Kun Zhou, Guangdong (CN)

(73) Assignee: SHENZHEN CAMSENSE TECHNOLOGIES CO., LTD, Shenzhen (CN)

( * ) Notice: Subject to any disclaimer, the term of this patent is extended or adjusted under 35 U.S.C. 154(b) by 847 days.

(21) Appl. No.: 17/239,678

(22) Filed: Apr. 25, 2021

(65) Prior Publication Data

US 2021/0247494 A1 Aug. 12, 2021

Related U.S. Application Data

(63) Continuation-in-part of application No. PCT/CN2019/130008, filed on Dec. 30, 2019.

(30) Foreign Application Priority Data

Dec. 26, 2019 (CN) .......................... 201922395373.4
Apr. 7, 2021 (CN) .......................... 202120707055.1

(51) Int. Cl.
*G01S 7/481* (2006.01)
*A47L 9/28* (2006.01)
(Continued)

(52) U.S. Cl.
CPC .............. *G01S 7/4813* (2013.01); *A47L 9/28* (2013.01); *A47L 9/2852* (2013.01);
(Continued)

(58) Field of Classification Search
CPC ........ G01S 7/4813; G01S 7/4817; A47L 9/28; A47L 9/2852; A47L 9/2889; A47L 11/24;
(Continued)

(56) References Cited

U.S. PATENT DOCUMENTS 9,739,874 B2 8/2017 Lee
9,757,003 B1 9/2017 Li et al.
(Continued)

FOREIGN PATENT DOCUMENTS

CN 202739924 U 2/2013
CN 203317434 U 12/2013
(Continued)

*Primary Examiner* — David Redding

(57) ABSTRACT

The present disclosure provides a distance measuring device and a sweeping robot. The distance measuring device includes a base, a baffle, a drive assembly, a ranging component, and a driving component. The baffle is arranged over the base, and may prevent foreign matters over the baffle from intruding into the drive assembly. The baffle may be a portion extended upwards from the base, or may be arranged over the base in a mounting manner. The drive assembly may transmit power of the driving component to the ranging component. The driving component and the ranging component are mounted on the base. The baffle is arranged over the base, and defines a closed or a semi-closed mounting chamber with the base to block foreign matters from intruding into the drive assembly.

17 Claims, 9 Drawing Sheets

(51) Int. Cl.
    *A47L 11/24*     (2006.01)
    *A47L 11/40*     (2006.01)

(52) U.S. Cl.
    CPC .............. *A47L 9/2889* (2013.01); *A47L 11/24* (2013.01); *A47L 11/4011* (2013.01); *A47L 11/4077* (2013.01); *G01S 7/4817* (2013.01); *A47L 2201/04* (2013.01)

(58) Field of Classification Search
    CPC .............. A47L 11/4011; A47L 11/4077; A47L 2201/04; A47L 11/4002; A47L 11/4061
    See application file for complete search history.

(56)     References Cited

U.S. PATENT DOCUMENTS

| | | |
|---|---|---|
| 2017/0296023 A1 | 10/2017 | Qiao et al. |
| 2018/0003823 A1 | 1/2018 | Yan |

FOREIGN PATENT DOCUMENTS

| | | |
|---|---|---|
| CN | 203438228 U | 2/2014 |
| CN | 104132639 A | 11/2014 |
| CN | 105988120 A | 10/2016 |
| CN | 206076698 U | 4/2017 |
| CN | 108072869 A | 5/2018 |
| CN | 108443465 A | 8/2018 |
| CN | 209172024 U | 7/2019 |
| CN | 209611017 U | 11/2019 |
| CN | 209690505 U | 11/2019 |
| CN | 110588816 A | 12/2019 |
| EP | 3399337 A1 | 11/2018 |
| JP | 3178159 U | 9/2012 |
| WO | 2015165008 A1 | 11/2015 |
| WO | 2019093096 A1 | 5/2019 |

DISTANCE MEASURING DEVICE AND SWEEPING ROBOT

CROSS-REFERENCE TO RELATED APPLICATIONS

The present application is a Continuation-In-Part of International Application No. PCT/CN2019/130008, with an international filing date of Dec. 30, 2019, which is based upon and claims priority to Chinese Patent Application No. 201922395373.4, filed with the Chinese Patent Office on Dec. 26, 2019, titled "DISTANCE MEASURING DEVICE". The present application also claims priority to Chinese Patent Application No. 202120707055.1, filed with the Chinese Patent Office on Apr. 7, 2021, titled "DISTANCE MEASURING DEVICE AND SWEEPING ROBOT". The entire contents of the above applications are hereby incorporated by reference in their entirety.

TECHNICAL FIELD

Embodiments of the present disclosure relate to the technical field of robots, and in particular, relate to a distance measuring device and a sweeping robot equipped with the distance measuring device.

BACKGROUND

Sweeping robots, also referred to as automatic cleaners, robotic vacuum cleaners, and the like, are a kind of smart household appliances. The sweeping robot, by virtue of artificial intelligence, automatically cleans the floor in the rooms. In order to enable the sweeping robot to perform highly-efficient and reasonable cleaning in an unknown environment, it is common practice in the field to configure a distance measuring device in the sweeping robot. Generally, the distance measuring device is a LiDAR, the sweeping robot, by this distance measuring device, is capable of achieving positioning and navigation thereof, and hence doing the cleaning according to a reasonable path.

The distance measuring device generally includes a base plate, a drive assembly mounted on the base plate, a ranging component mounted on the drive assembly, and a driving component mounted on the base plate and configured to drive the drive assembly to rotate. The drive assembly includes a driving wheel and a driven wheel mounted on the base plate, and a belt wound on the driving wheel and the driven wheel.

SUMMARY

A distance measuring device according to an embodiment of the present disclosure includes a base, a baffle, a drive assembly, a ranging component, and a driving component. The base includes a base plate. The baffle is arranged opposite to the base plate and covers part of the base plate, and the baffle and the base defines a mounting chamber. The drive assembly is arranged in the mounting chamber. The ranging component is connected to the drive assembly, and is driven by the drive assembly to rotate. The driving component is connected to the drive assembly to transmit, by the drive assembly, a driving force to the ranging component.

A distance measuring device according to another embodiment of the present disclosure includes a base, a baffle, and a drive assembly. The baffle is arranged opposite to the base plate and covers part of the base plate, and the baffle and the base defines a mounting chamber. The drive assembly is arranged in the mounting chamber.

A sweeping robot according to an embodiment of the present disclosure includes any one of the above distance measuring devices.

BRIEF DESCRIPTION OF THE DRAWINGS

For clearer descriptions of the technical solutions according to the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

DETAILED DESCRIPTION

Figure 1:
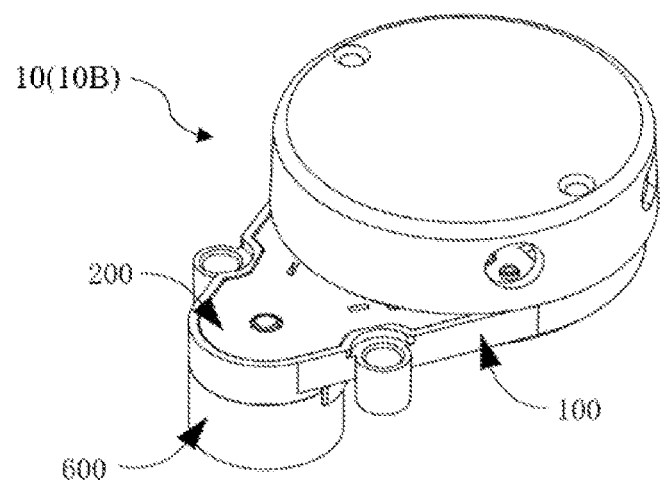
FIG. 1 is a schematic perspective view of a distance measuring device according to a first embodiment of the present disclosure.

For better understanding of the present disclosure, the present disclosure is described in detail with reference to attached drawings and specific embodiments. It should be noted that, when an element is defined as "being secured or fixed or mounted to" another element, the element may be directly positioned on the element or one or more centered elements may be present therebetween. When an element is defined as "being connected to" another element, the element may be directly connected to the element or one or more centered elements may be present therebetween. As used herein, the terms "vertical," "horizontal," "left," "right," "inner," "outer," and similar expressions are only for illustration purposes.

Unless the specification clearly requires otherwise, throughout the description and the claims, the technical and scientific terms, such as "comprise," "comprising," "include," "including" and the like are to be construed in an inclusive sense as opposed to an exclusive or exhaustive sense. Additionally, the terms used in the specification of the present disclosure are merely for description the embodiments of the present disclosure, but are not intended to limit the present disclosure. As used herein, the term "and/or" includes any and all combinations of one or more related listed items.

In addition, technical features involved in various embodiments of the present disclosure described hereinafter may be combined as long as these technical features are not in conflict.

In the specification, the term "mount" includes fixing or retaining an element or device to a specific position or place by welding, threading, snapping, bonding or the like. The element or device may remain stationary in the specific position or place or may be movable within a specified range; and the element or device, after being fixed or retained to the specific position or place, may be detachable or not detachable, which are not limited in the embodiments of the present disclosure.

When the distance measuring apparatus is mounted on the sweeping robot, the driving wheel and part of the belt of the drive assembly are generally in an exposed state; when the sweeping robot suctions hair and the like foreign matters from the floor, the foreign matters are tended to be wound on the drive assembly under the effect of an internal wind pressure, such that the driving wheel and/or the driven wheel is locked. As a result, the distance measuring apparatus fails to normally operate.

In addition, when the distance measuring device is mounted on the sweeping robot, even if a fixing base and a shroud are covered on the distance measuring device, the mounting chamber of the distance measuring device fails to be covered since the fixing base and the shroud are not parts of the distance measuring device and are not attached to the distance measuring device. Therefore, the fixing base and the shroud fail to block the foreign matters from being wound on the belt. Therefore, in a sweeping robot including the distance measuring device and the fixing base and the shroud covering the distance measuring device, the technical problem to be solved by the present disclosure remains to be solved. That is, the foreign matters may enter the mounting chamber via the shroud and the gap between the shroud and the fixing base, thereby causing deadlock of the belt.

Embodiments of the present disclosure provide a distance measuring device, that may solve the technical problem that the distance measuring device fails to normally operate due to foreign matters entering a drive assembly of the distance measuring device.

Figure 2:
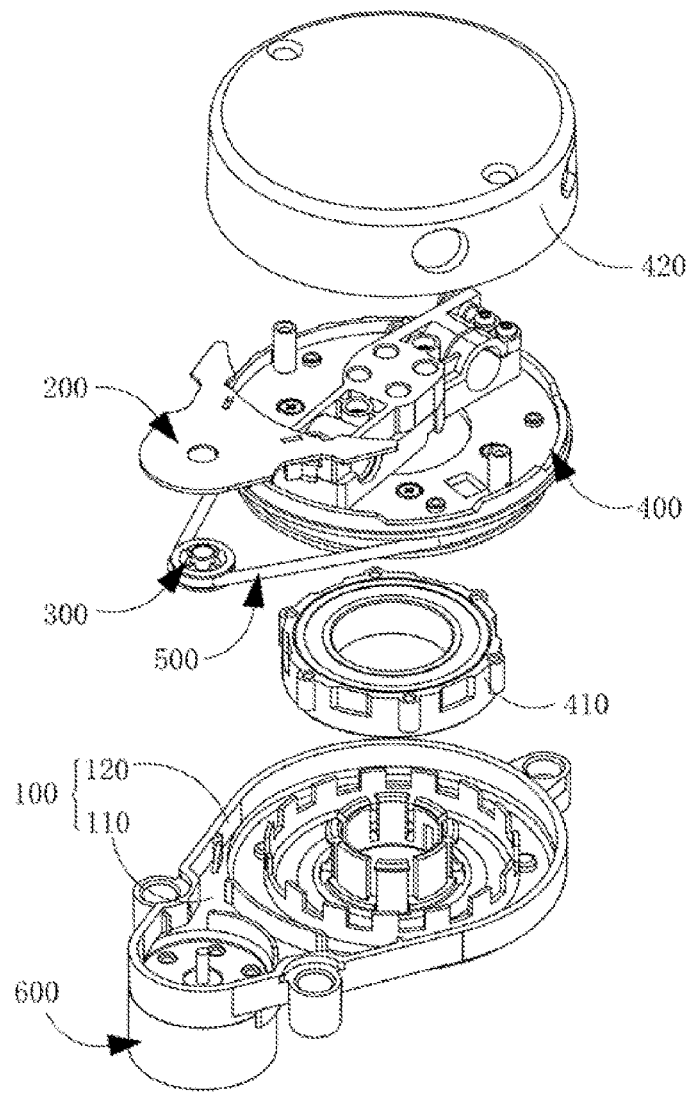
FIG. 2 is a schematic exploded view of the distance measuring device in FIG. 1.

Referring to both FIG. 1 and FIG. 2, a schematic perspective view and a schematic exploded view of a distance measuring device according to a first embodiment of the present disclosure are respectively illustrated. The distance measuring device 10 includes a base 100, a baffle 200, a first drive wheel 300, a second drive wheel 400, a connecting component 500, and a driving component 600. The base 100 includes a base plate 110, and a side wall 120, wherein the side wall 120 may be obtained by extending the base plate 110, or may be independent of the base plate 110 and fixedly connected to one end of the base plate. The baffle 200 is arranged opposite to the base plate 110, and covers part of the base plate 110. The first drive wheel 300, the second drive wheel 400, and the connecting component 500 constitute a drive assembly. The first drive wheel 300 and the second drive wheel 400 are both rotatably mounted on the base plate 110, and are both positioned at an end, proximal to the baffle 200, of the base plate 110. The connecting component 500 is wound on both the first drive wheel 300 and the second drive wheel 400, and is configured to drive the second drive wheel 400 to rotate when the first drive wheel 300 rotates. The driving component 600 is connected to the first drive wheel 300, and is configured to drive the first drive wheel 300 to rotate. The side wall 120 at least partially encloses an outer periphery of the first drive wheel 300, the baffle 200 is attached to a part of the side wall 120 enclosing the outer periphery of the first drive wheel 300, and the base plate 110, the baffle 200, the side wall 120, and the second drive wheel 400 collaboratively define a mounting chamber, wherein the first drive wheel 300 is received in the mounting chamber.

Figure 3:
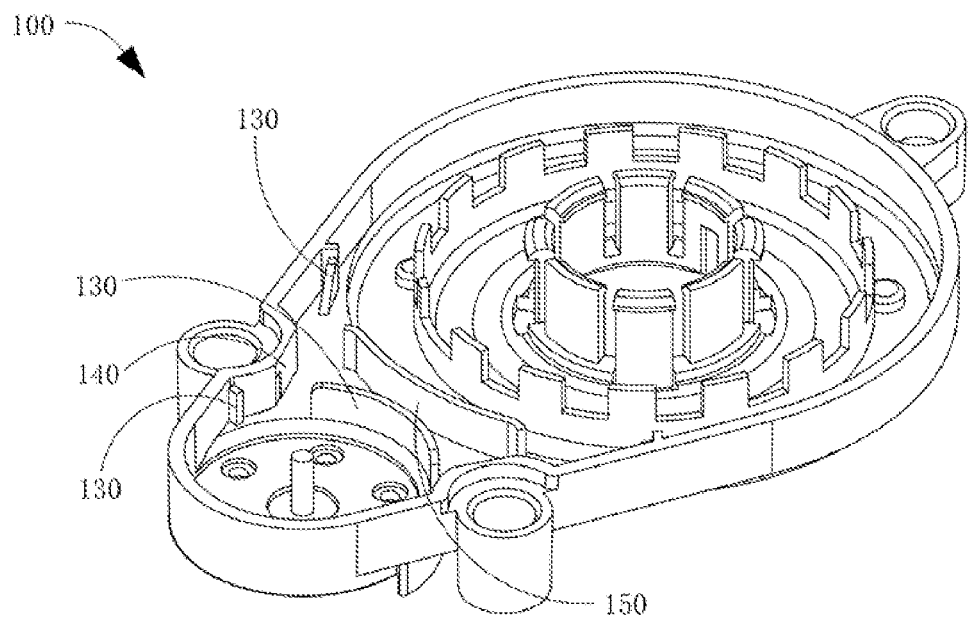
FIG. 3 is a schematic perspective view of a base in FIG. 2.

For the above base 100, referring to FIG. 3, a schematic perspective view of the base 100 is illustrated. Still referring to both FIG. 1 and FIG. 2, the base 100 includes the base plate 110 and the side wall 120. In this embodiment, one end of the side wall 120 is perpendicularly connected to an edge of the base plate 110, and the other end of the side wall 120 extends towards the baffle 200. The side wall 120 is a complete side wall and has an approximately uniform height. The side wall 120 and the base plate 110 collaboratively define a receiving slot. The receiving slot is configured to receive the first drive wheel 300 and the second drive wheel 400. That is, the side wall 120 encloses an outer periphery of the first drive wheel 300 and the second drive wheel 400.

Figure 4:
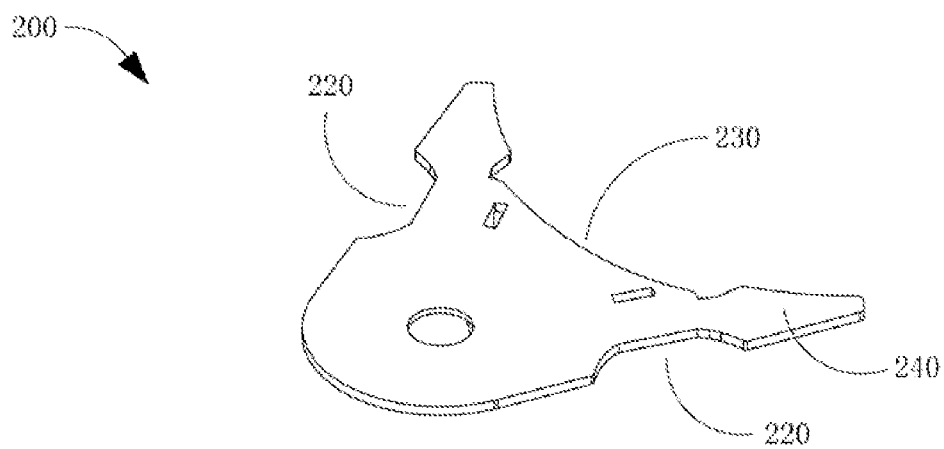
FIG. 4 is a schematic perspective view of a baffle in FIG. 2 in one orientation.
Figure 5:
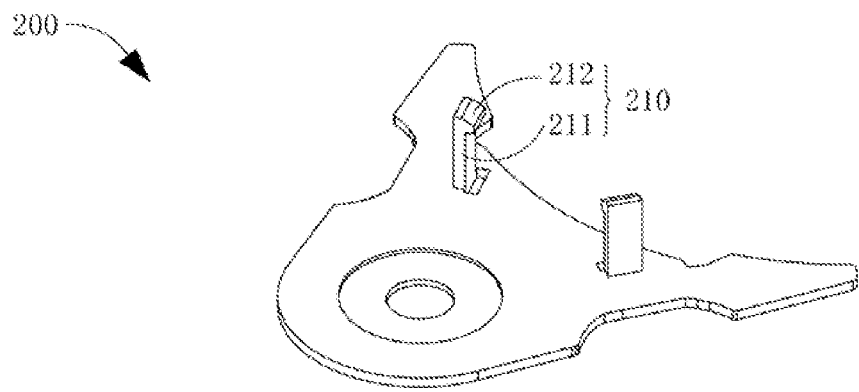
FIG. 5 is a schematic perspective view of the baffle in FIG. 2 in another orientation.

For the above baffle 200, referring to both FIG. 4 and FIG. 5, schematic perspective views of the baffle 200 in two orientations are respectively illustrated. Still referring to both FIG. 1 to FIG. 3, the baffle 200 is entirely in a plate-like structure, and is arranged opposite to the base plate 110 and covers part of the base plate 110. The baffle 200 is entirely received in the receiving slot, and the baffle 200 and the part of the side wall 120 enclosing the outer periphery of the first drive wheel 300 are attached to each other. Along an orientation parallel to the orientation of the first drive wheel 300 towards the second drive wheel 400, one end of the baffle 200 covers the first drive wheel 300, and the other end of the baffle 200 extends towards the second drive wheel 400 to an edge of the second drive wheel 400. In addition, along the orientation parallel to the orientation of the first drive wheel 300 towards the second drive wheel 400, shapes of ends, proximal to the second drive wheel 400, of the baffle 200 are adapted to a shape of the second drive wheel 400. A person skilled in the art would understand that to prevent interference caused by the baffle 200 to the second drive wheel 400, an extremely small gap is defined between an end, proximal to the second drive wheel 400, of the baffle 200 and the second drive wheel 400, and the end, proximal to the second drive wheel 400, of the baffle 200 is in an arc shape or an approximately arc shape adapted to a side profile of the second drive wheel 400. The base plate 110, the baffle 200, the side wall 120, and the second drive wheel 400 collaboratively define the mounting chamber, and an enclosure portion of any two of the base 100, the baffle 200, and the second drive wheel 400 may be completely sealed to block foreign matters from entering the mounting chamber. The first drive wheel 300 is received in the mounting chamber. Nevertheless, since complete sealing of the mounting chamber may greatly improve the manufacture cost and the assembling difficulty of the distance measuring device, in some embodiments, a gap is defined between the enclosure portion between any two of the base 100, the baffle 200, and the second drive wheel 400. In general, the gap is small, and is generally controlled within 5 mm, for example, 3 mm, 2 mm, or smaller than 1 mm, or other values smaller than 5 mm. It should be noted that description that "the baffle and the part of the side wall at the outer periphery of the first drive wheel are attached to each other as mentioned in the present disclosure" means that a shape profile of the baffle 200 is adapted to a shape profile of the part of the side wall 120 at the outer periphery of the first drive wheel 300, and the baffle 200 is in contact with the enclosed portion. In this embodiment, profiles of the baffle 200 and a corresponding position of the side wall 120 are both in a C-shaped structure, and a side face of the baffle 200 is attached to a side face of the side wall 120. In other embodiments, a surface of the baffle 200 facing towards the base plate 110 is attached to a top face of the side wall 120, and the top face is an end surface, distal from the base plate 110, of the side wall 120.

To prevent the baffle 200 from excessively extending into the receiving slot which causes interference between the baffle 200 and the first drive wheel 300, the base 100 further includes at least one limiting rib 130 arranged between the base plate 110 and the baffle 200. Specifically, referring to FIG. 3, one end of the limiting rib 130 is connected to the base plate 110, and the other end of the limiting rib 130 extends towards the baffle 200. Along an orientation of the base plate 110 towards the baffle 200, a distance between an end, distal from the base plate 110, of the limiting rib 130 and the base plate 110 is greater than a distance between an end, distal from the base plate 110, of the first drive wheel 300 and the base plate 110. The baffle 200 is carried on the at least one limiting rib 130, and is fixedly connected to the base plate 110. The end, distal from the base plate 110, of the limiting rib 130 is abutted against the baffle 200, such that the limiting rib 130 securely and reliably supports the baffle 200. It may be understood that in other embodiments of the present disclosure, one end of the limiting rib may be connected to the baffle, and the other end of the limiting rib may extend towards the base plate and may be abutted against the base plate to support the baffle. That is, one end of the limiting rib is fixed to one of the base plate and the baffle, and the other end of the limiting rib is abutted against the other of the base plate and the baffle.

In this embodiment, the baffle 200 is fixed to the base plate 110 of the base 100 by snap-fitting. Specifically, an end, proximal to the base plate 110, of the baffle 200 is provided with a latch 210. The latch 210 includes a connecting portion 211 and a latch portion 212. One end of the connecting portion 211 is connected to the baffle 200, and the other end of the connecting portion 211 extends towards the base plate 110. The latch portion 212 is arranged at an end, distal from the baffle 200, of the connecting portion 211. A through slot is arranged at a position of the base plate 110 corresponding to the latch 210. The latch portion 212 passes through the through slot, and is abutted against a surface, distal from the baffle 200, of the base plate 110, such that the baffle 200 and the base plate 110 are fixedly connected. It may be understood that in other embodiments of the present disclosure, the latch may also be arranged on the base plate 110, and correspondingly, a through slot is arranged at a position of the baffle 200 corresponding to the latch. The latch portion of the latch passes through the through slot on the baffle, and is abutted against a surface, distal from the base plate 110, of the baffle 200. It should be understood that in other embodiments of the present disclosure, the baffle 200 and the base 100 may also be fixedly connected in other fashions in addition to snap connection, for example, thread connection, bonding by an adhesive, and ultrasonic connection, which is not limited herein.

Further, for ease of positioning and mounting of the baffle 200, the baffle 200 is provided with at least one groove 220 at an attachment position between the baffle 200 and the side wall 120, and correspondingly, the side wall 120 is provided with a bump 140 adapted to the groove 220. The bump 140 is inserted into the groove 220. Engagement of the bump 140 and the groove 220, in one aspect, facilitates positioning and mounting of the baffle 200, and in another aspect, prevents the baffle 200 from sliding in a plane parallel to the base plate 110. It may be understood that in other embodiments of the present disclosure, the groove may also be arranged on the side wall 120, and correspondingly, the bump is arranged on the baffle. By the groove and the bump, the baffle 200 and the base 100 are positioned and mounted, and are limited in the plane parallel to the base plate 110.

To further prevent the baffle 200 from sliding in the plane parallel to the base plate 110 when carried on the limiting ribs 130, the distance measuring device 10 further includes a positioning rib 150. One end of the positioning rib 150 is fixed to the end, proximal to the baffle 200, of the base plate 110, and the other end of the positioning rib 150 extends towards the baffle 200. A positioning groove 230 adapted to the positioning rib 150 is arranged at a position corresponding to the positioning rib 150 on the baffle 200. The positioning rib 150 is inserted into the positioning groove 230. The positioning rib 150 and the side wall 120 cooperates with each other to prevent the baffle 200 from moving in the plane parallel to the base plate 110. In this embodiment, the positioning rib 150 extends like a stripe on the plane of the base plate 110, and is arranged between the first drive wheel 300 and the second drive wheel 400 and spaces the first drive wheel 300 apart from the second drive wheel 400. A gap is defined between each of both ends of the positioning rib 150 and the side wall 120. The connecting component 500 may pass through the gap and may be hence entirely wound on the first drive wheel 300 and the second drive wheel 400. The positioning groove 230 corresponds to the positioning rib 150, and extends to pass through the baffle 200 along the orientation of the first drive wheel 300 towards the second drive wheel 400. With the positioning groove 230, two wing portions 240 are defined at an end, proximal to the second drive wheel 400, of the baffle 200. The positioning rib 150 is inserted into the positioning groove 230, and is abutted against to a wall portion, distal from the second drive wheel 400, of the positioning groove 230. Hence, the positioning rib 150 cooperates with the part enclosing at the outer periphery of the first drive wheel 300 to constrain the baffle 200 between profiles enclosed thereby. In this way, the baffle 200 is prevented from moving in the plane parallel to the base plate 110.

For the above first drive wheel 300, the second drive wheel 400 and the connecting component 500, referring to FIG. 2, the first drive wheel 300 and the second drive wheel 400 are both rotatably mounted on the base 100; and the connecting component 500 is entirely closed in a stripe-shaped structure, is wound on both the first drive wheel 300 and the second drive wheel 400, and is capable of driving the second drive wheel 400 to rotate when the first drive wheel 300 rotates. The first drive wheel 300, the second drive wheel 400, and the connecting component 500 are all received in the receiving slot. That is, the first drive wheel 300, the second drive wheel 400, and the connecting component 500 are all positioned at an end, proximal to the baffle 200, of the base plate 110, and the base plate 110 and the side wall 120 collaboratively enclose the first drive wheel 300 and the second drive wheel 400. In this embodiment, the first drive wheel 300 is a first pulley, and is indirectly rotatably mounted on the base 100 by an output end of the driving component 600 fixed to the base 100; the second drive wheel 400 is a second pulley, and is rotatably mounted on the base 100 by a bearing 410, and a ranging component including a lens, a laser generator, a circuit board, and the like, and a shroud 420 covering the lens, the laser generator, the circuit board, and the like are mounted at an end, distal from the base plate 110, of the second drive wheel 400; and the connecting component 500 is a belt or a rubber belt. It should be noted that a distance between an end surface, distal from the base plate 110, of the second drive wheel 400 and the base plate 110 is greater than a distance between an end, distal from the base plate 110, of the first drive wheel 300 and the base plate 110, such that the second drive wheel 400 defines the mounting chamber together with the base plate 110, the side wall 120, and the baffle 200. It may be understood that even if the first drive wheel 300 and the second drive wheel 400 in this embodiment are pulleys, the connecting component 500 is a belt or a rubber belt, and the present disclosure is not limited to such configuration. For example, in some other embodiments of the present disclosure, the first drive wheel 300 may also be a first sprocket, and correspondingly, the second drive wheel 400 is a second sprocket, and the connecting component 500 is a chain. The chain is wound on the first sprocket and the second sprocket. In other embodiments, a drive assembly using a link rod may also be employed.

Figure 6:
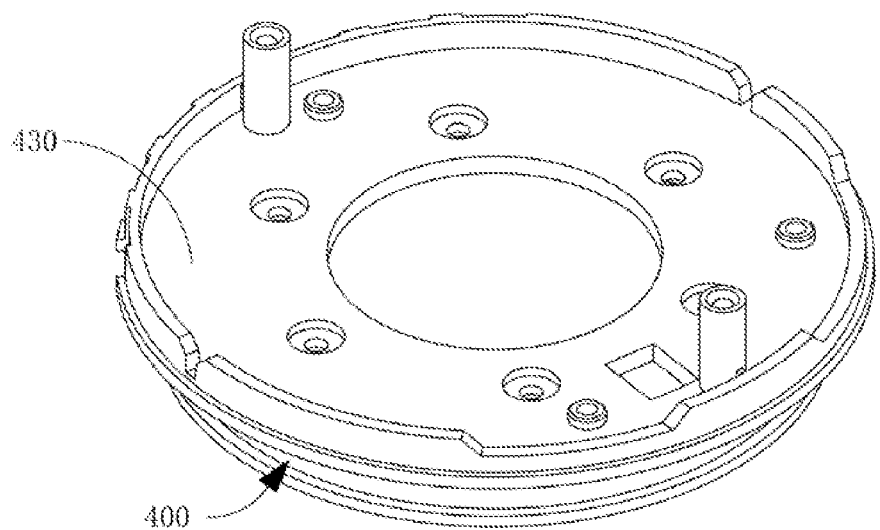
FIG. 6 is a schematic perspective view of a second drive wheel in FIG. 2 in one orientation.
Figure 7:
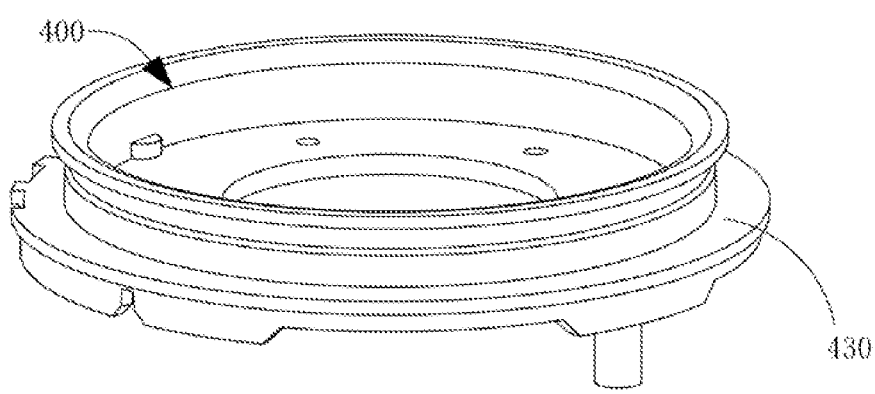
FIG. 7 is a schematic perspective view of the second drive wheel in FIG. 2 in another orientation.

Further, referring to FIG. 6 and FIG. 7, the distance measuring device further includes a mounting plate 430 to prevent external foreign matters from entering the receiving slot from the gap between the second drive wheel 400 and the baffle 200 and between the gap between the second drive wheel 400 and the side wall 120 to be hence wound on at least one of the first drive wheel 300, the second drive wheel 400, and the connecting component 500, such that the first drive wheel 300 and/or the second drive wheel 400 is locked. An end, distal from base plate 110, of the second drive wheel 400, extends out of the receiving slot. The mounting plate 430 is entirely in a flat cylindrical plate-like structure, and is fixed to an end, distal from the base plate 110, of the second drive wheel 400, and entirely covers the gap between the second drive wheel 400 and the baffle 200 and the gap between the second drive wheel 400 and the side wall 120. The mounting plate 430, the baffle 200, the side wall 120, and the base plate 110 collaboratively define a drive space entirely enclosing the first drive wheel 300, the second drive wheel 400, and the connecting component 500. In this case, it is hard for foreign matters to enter the space. The ranging component including the shroud 420 and the like is mounted at an end, distal from the base plate 110, of the mounting plate 430.

For the above the driving device 600, still referring to FIG. 2, an output end of the driving component 600 is connected to the first drive wheel 300, and the driving component 600 is configured to drive the first drive wheel 300 to rotate. In this embodiment, the driving component 600 is a motor. A main body of the motor is fixed to a surface, distal from the baffle 200, of the base plate 110, the output end of the motor passes through the base plate 110 and extends into the mounting chamber and is connected to the first drive wheel 300. That is, the first drive wheel 300 is indirectly rotatably mounted on the base 100 by the driving component 600. It may be understood that in other embodiments of the present disclosure, the first drive wheel 300 may also be directly rotatably mounted on the base 100. It should be understood that the driving component 600 may also be any mechanism capable of implementing rotation output, to drive the first drive wheel 300 to rotate, for example, a cylinder, which is not exemplified herein.

The distance measuring device 10 according to the embodiments of the present disclosure includes the base 100, the baffle 200, the first drive wheel 300, the second drive wheel 400, the connecting component 500, and the driving component 600. The base 100 includes the base plate 110. The base plate 110 is arranged opposite to the baffle 200, and the baffle 200 covers part of the base plate 110. The first drive wheel 300 and the second drive wheel 400 are both rotatably mounted on a side, proximal to the baffle 200, of the base plate 110, and the connecting component 500 is wound on the first drive wheel 300 and the second drive wheel 400. The driving component 600 is connected to the first drive wheel 300, and is configured to drive the first drive wheel 300 to rotate. That is, the first drive wheel 300 is a driving wheel. The base 100 further includes a side wall 120. The side wall 120 at least partially encloses an outer periphery of the first drive wheel 300, the baffle 200 is attached to a part of the side wall 120 enclosing the outer periphery of the first drive wheel 300, and the base plate 110, the baffle 200, and the side wall 120 collaboratively enclose the first drive wheel 300. The base plate 110, the baffle 200, the side wall 120, and the second drive wheel 400 collaboratively define a mounting chamber which entirely encloses the first drive wheel 300. In addition, it is hard for external foreign matters to enter the mounting chamber and be wound on the first drive wheel. In this way, the technical problem that the driving wheel locked by foreign matters wound thereon is addressed.

In addition, a mounting plate 430 is arranged at an end, distal from the base plate 110, of the second drive wheel 400. The mounting plate 430, the baffle 200, the side wall 120, and the base plate 110 collaboratively define a drive space entirely enclosing the first drive wheel 300, the second drive wheel 400, and the connecting component 500. In this case, it is hard for foreign matters to enter the drive space. Therefore, the risks that the drive wheel is locked due to foreign matters wound on the second drive wheel 400 and the connecting component 500 are avoided.

In some embodiments, as illustrated in FIG. 1 and FIG. 2, the baffle 200 may at least partially cover the first drive wheel 300, and in particular cover a connecting portion (or an engaging portion) between the first drive wheel 300 and the connecting component 500 from above to prevent foreign objects from intruding. For example, a hole may be arranged on the baffle 200 for inserting and mounting one end of a rotary shaft of the first drive wheel 300. In this way, the baffle 200 may expose a small part of the first drive wheel 300, or the baffle 200 does not completely cover the base plate 110 where the first drive wheel 300 is arranged, and instead, the baffle 200 exposes a part of the first drive wheel 300, or exposes a part of the base plate 110 on the periphery of the first drive wheel 300. In some other embodiments, the baffle 200, together with the base plate 110, the side wall 120, and the second drive wheel 400, defines a closed space, and hence the baffle 200 completely covers the first drive wheel 300.

In some embodiments, as illustrated in FIG. 1 and FIG. 2, the baffle 200 may at least partially cover the connecting component 500. For example, the baffle 200 does not completely cover the base plate 110 where the first drive wheel 300 is arranged, but only partially covers the connecting component 500, and hence the baffle 200 exposes a part of the first drive wheel 300, or exposes a part of the base plate 110 on the periphery of the first drive wheel 300. It may be easy to understand, if the baffle 200 is used, no matter the baffle 200 partially or completely covers the first drive wheel 300, and the connecting component 500 connected to the first drive wheel 300, foreign matters over the baffle 200 are prevented from intruding into the drive assembly.

In some embodiments, as illustrated in FIG. 1 and FIG. 2, the ranging component completely covers the second drive wheel 400. Since the ranging component needs to be mounted on the second drive wheel 400, dimensions, for example, a diameter, of the ranging component may be designed greater than or equal to dimensions, for example, a diameter, of the second drive assembly 400, such that the ranging component completely covers the second drive wheel 400. As such, the ranging component may also achieve the effect of preventing foreign matters over the baffle 200 from intruding into the drive assembly, and particularly preventing foreign matters from intruding into the second drive wheel 400 of the drive assembly.

It should be understood that even if in this embodiment, the side wall 120 and the base plate 110 are integrally arranged, the present disclosure is not limited to such configuration. In other embodiments of the present disclosure, the side wall 120 may also be integrally arranged with the baffle 200, and the side wall 120 extends from the baffle 200 to the base plate 110. In this case, the base 100 still includes the base plate 110, and the side wall 120 extending from the base plate 110 to the baffle 200.

Figure 8:
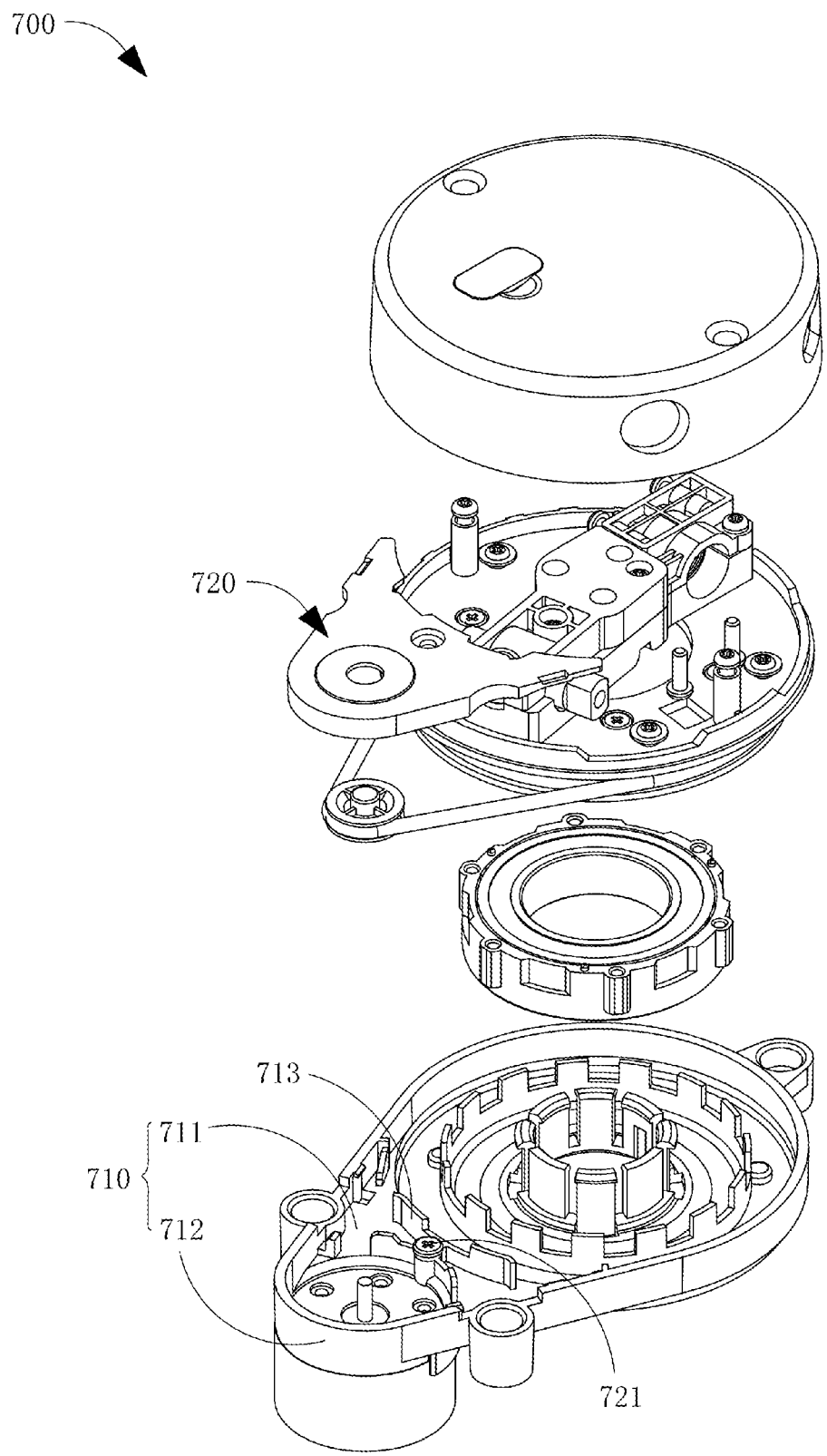
FIG. 8 is a schematic exploded view of a distance measuring device according to a second embodiment of the present disclosure.

Referring to FIG. 8, a distance measuring device 700 according to a second embodiment of the present disclosure is illustrated. Still referring to FIG. 1 to FIG. 7, the distance measuring device 700 is mainly different from the distance measuring device according to the first embodiment as follows.

The baffle 200 in the distance measuring device according to the first embodiment is provided with the groove 220, the side wall 120 is correspondingly provided with the bump 140 adapted to the groove 220, positioning is achieved between the baffle 200 and the base 100 by the groove 220 and the bump 140, and the baffle 200 is fixed to the base 100 by snap-fitting.

However, the distance measuring device 700 according to the second embodiment includes a base 710 and a baffle 720. The baffle 720 is not provided with the groove. The base 710 is not correspondingly provided with the bump. The baffle 720 achieves positioning in a plane parallel to the base plate 711 by cooperation between a positioning rib 713 and a side wall 712 enclosing an outer periphery of the first drive wheel 300. In addition, the baffle 720 and the base 710 are fixedly connected to each other by a threaded fastener 721. Specifically, a limiting rib is provided with a thread hole, a hole is arranged at a position of the baffle 720 corresponding to the thread hole, the threaded fastener 721 passes through the hole and extends into the thread hole, and is hence connected to the base plate 711, such that the baffle 720 is fixed to the base 710.

Since the second drive wheel is rotatably mounted on the base 710 by a bearing, in an assembly process, the second drive wheel is generally mounted before the baffle 720 is mounted. In this case, during mounting of the baffle 720, two swing portions of the baffle 720 is first obliquely inserted beneath a mounting plate, and then is rotated to be horizontally carried on the limiting ribs. In this process, configuration of the groove and the bump according to the first embodiment may tend to cause interference between the baffle and the base, which increases the difficulty of mounting and dismounting of the baffle. Therefore, during mounting of the baffle 720 according to the second embodiment, the two swing portions only need to be obliquely inserted beneath the mounting plate, and then the baffle 720 is rotated such that the positioning groove cooperates with the positioning rib. In the meantime, a side portion of the baffle 720 is attached to a part of the side wall 712 enclosing the outer periphery of the first drive wheel, and the baffle 720 is made to be carried on the limiting ribs. Accordingly, the distance measuring device according to the second embodiment more facilitates mounting and dismounting of the baffle 720, and helps to improve the efficiency and experience of an operator during mounting the baffle 720. Meanwhile, the threaded fastener 721 achieves a better fastening effect over the snap-fitting connection.

Based on the same inventive concept, an embodiment of the present disclosure further provides another distance measuring device. The distance measuring device 10B has a similarity to the distance measuring device 10 according to the first embodiment. Therefore, the specific structure of the distance measuring device 10B is still described hereinafter with reference to FIG. 1 to FIG. 7.

First, referring to both FIG. 1 and FIG. 2, the distance measuring device 10B includes a base 100, a baffle 200, a drive assembly (not illustrated in the drawings), and a ranging device configured to measure distances. The base 100 includes a base plate 110, and a side wall 120 extending from the base plate 110. The baffle 200 is arranged opposite to the base plate 110, and covers part of the base plate 110. The drive assembly includes the first drive wheel 300. The first drive wheel 300 is rotatably mounted on the base plate 110, and is arranged at an end, proximal to the baffle 200, of the base plate 110. The first drive wheel 300 is rotatable relative to the base plate under driving by an external driving device. The side wall 120 at least partially encloses an outer periphery of the first drive wheel 300, the baffle 200 is attached to a part of the side wall 120 enclosing the outer periphery of the first drive wheel 300, and the base plate 110, the baffle 200, and the side wall 120 collaboratively enclose the first drive wheel 300. The ranging device (not illustrated in the drawings) is mounted on the drive assembly, and is rotatable by 360 degrees in a plane parallel to the base plate 110 under driving by the drive assembly, thereby implementing a ranging task.

For the above base 100, referring to FIG. 3, a schematic perspective view of the base 100 is illustrated. Still referring to both FIG. 1 and FIG. 2, the base 100 includes the base plate 110 and the side wall 120. In this embodiment, one end of the side wall 120 is perpendicularly connected to an edge of the base plate 110, and the other end of the side wall 120 extends towards the baffle 200. The side wall 120 and the base plate 110 collaboratively define a receiving slot. The receiving slot is configured to receive the drive assembly. That is, the side wall 120 encloses an outer periphery of the drive assembly.

For the above baffle 200, referring to both FIG. 4 and FIG. 5, schematic perspective views of the baffle 200 in two orientations are respectively illustrated. Still referring to both FIG. 1 to FIG. 3, the baffle 200 is entirely in a plate-shaped structure, and is arranged opposite to the base plate 110 and covers part of the base plate 110. The baffle 200 is entirely received in the receiving slot, and the baffle 200 and the part of the side wall 120 enclosing the outer periphery of the first drive wheel 300 are attached to each other.

To prevent the baffle 200 from excessively extending into the receiving slot which causes interference between the baffle 200 and the first drive wheel 300, the base 100 further includes at least one limiting rib 130 arranged between the base plate 110 and the baffle 200. Specifically, referring to FIG. 3, one end of the limiting rib 130 is connected to the base plate 110, and the other end of the limiting rib 130 extends towards the baffle 200. Along an orientation of the base plate 110 towards the baffle 200, a distance between an end, distal from the base plate 110, of the limiting rib 130 and the base plate 110 is greater than a distance between an end, distal from the base plate 110, of the first drive wheel 300 and the base plate 110. The baffle 200 is carried on the at least one limiting rib 130, and is fixedly connected to the base plate 110. The end, distal from the base plate 110, of the limiting rib 130 is abutted against the baffle 200, such that the limiting rib 130 securely and reliably supports the baffle 200. It may be understood that in other embodiments of the present disclosure, one end of the limiting rib may be connected to the baffle, and the other end of the limiting rib may extend towards the base plate and may be abutted against the base plate to support the baffle. That is, one end of the limiting rib is fixed to one of the base plate and the baffle, and the other end of the limiting rib is abutted against the other of the base plate and the baffle.

In this embodiment, the baffle 200 is fixed to the base plate 110 of the base 100 by snap-fitting. Specifically, an end, proximal to the base plate 110, of the baffle 200 is provided with a latch 210. The latch 210 includes a connecting portion 211 and a latch portion 212. One end of the connecting portion 211 is connected to the baffle 200, and the other end of the connecting portion 211 extends towards the base plate 110. The latch portion 212 is arranged at an end, distal from the baffle 200, of the connecting portion 211. A through slot is arranged at a position of the base plate 110 corresponding to the latch 210. The latch portion 212 passes through the through slot, and is abutted against a surface, distal from the baffle 200, of the base plate 110, such that the baffle 200 and the base plate 110 are fixedly connected. It may be understood that in other embodiments of the present disclosure, the latch may also be arranged on the base plate 110, and correspondingly, a through slot is arranged at a position of the baffle 200 corresponding to the latch. The latch portion of the latch passes through the through slot on the baffle, and is abutted against the surface, distal from the base plate 110, of the baffle 200. It should be understood that in other embodiments of the present disclosure, the baffle 200 and the base 100 may also be fixedly connected in other fashions, for example, thread connection, which is not limited herein.

Further, for ease of positioning and mounting of the baffle 200, the baffle 200 is provided with at least one groove 220 at an attachment position between the baffle 200 and the side wall 120, and correspondingly, the side wall 120 is provided with a bump 140 adapted to the groove 220. The bump 140 is inserted into the groove 220. Engagement of the bump 140 and the groove 220, in one aspect, facilitates positioning and mounting of the baffle 200, and in another aspect, prevents the baffle 200 from sliding in a plane parallel to the base plate 110. It may be understood that in other embodiments of the present disclosure, the groove may also be arranged on the side wall 120, and correspondingly, the bump is arranged on the baffle. The baffle 200 and the base 100 are positioned and mounted by the groove and the bump, and are limited in the plane parallel to the base plate 110.

For the above drive assembly, referring to FIG. 2, the drive assembly includes the first drive wheel 300. The first drive wheel 300 is entirely enclosed by the base plate 110, the baffle 200, and the side wall 120. The ranging device is mounted on the first drive wheel 300, and is at least partially positioned on a side, distal from the base plate 110, of the baffle 200. In this embodiment, the ranging device includes a lens, a laser generator, a circuit board, or the like. The ranging device is capable of circumferentially rotating when the first drive wheel 300 rotates, to implement the ranging process of the distance measuring device 10B.

Further, considering that the first drive wheel 300 is directly connected to the external driving device, the first drive wheel 300 has a high rotation speed. As a result, the distance measuring process of the distance measuring device 10B is not stable. To overcome this defect, the drive assembly further includes the second drive wheel 400 and the connecting component 500. The second drive wheel 400 is rotatably mounted on the base 100, and is arranged on a side, proximal to the baffle 200, of the base plate. A radial dimension of the second drive wheel 400 is greater than a radial dimensional of the first drive wheel 300. The ranging device is mounted at an end, distal from the base plate 110, of the second drive wheel 400, and is sealed and protected by a shroud 420. Along an orientation parallel to the orientation of the first drive wheel 300 towards the second drive wheel 400, one end of the baffle 200 covers the first drive wheel 300, and the other end of the baffle 200 extends towards the second drive wheel to reach an edge of the second drive wheel 400. In addition, along an orientation parallel to the orientation of the first drive wheel 300 towards the second drive wheel 400, shapes of ends, proximal to the second drive wheel 400, of the baffle 200 are adapted to a shape of the second drive wheel 400. In this way, the base plate 110, the baffle 200, the side wall 120, and the second drive wheel 400 collaboratively define a mounting chamber. The first drive wheel 300 is received in the mounting chamber. The connecting component 500 is entirely in a closed stripe-shaped structure, and is wound on both the first drive wheel 300 and the second drive wheel 400, and is capable of driving the second drive wheel 400 to rotate when the first drive wheel 300 rotates. The second drive wheel 400 and the connecting component 500 are both received in the receiving slot. In this embodiment, the first drive wheel 300 is a first pulley; the second drive wheel 400 is a second pulley, and is rotatably connected to the base 100 by a bearing 410; and the connecting component 500 is a belt, and is in an annular closed shape and wound on the first pulley and the second pulley. It should be noted that a distance between an end surface, distal from the base plate 110, of the second drive wheel 400 and the base plate 110 is greater than a distance between an end, distal from the base plate 110, of the first drive wheel 300 and the base plate 110, such that the second drive wheel 400, the base plate 110, the side wall 120, and the baffle 200 collaboratively define the mounting chamber. It may be understood that even if the first drive wheel 300 and the second drive wheel 400 in this embodiment are pulleys, the connecting component 500 is a belt, such configuration is not limited in the present disclosure. For example, in some other embodiments of the present disclosure, the first drive wheel 300 may also be a first sprocket, and correspondingly, the second drive wheel 400 is a second sprocket, and the connecting component 500 is a chain. The chain is wound on the first sprocket and the second sprocket.

To further prevent the baffle 200 from sliding in the plane parallel to the base plate 110 when carried on the limiting ribs 130, the distance measuring device 10B further includes a positioning rib 150. One end of the positioning rib 150 is fixed to an end, proximal to the baffle 200, of the base plate 110, and the other end of the positioning rib 150 extends towards the baffle 200. A positioning groove 230 adapted to the positioning rib 150 is arranged at a position corresponding to the positioning rib 150 on the baffle 200. The positioning rib 150 is inserted into the positioning groove 230. The positioning rib 150 and the side wall 120 cooperates with each other to prevent the baffle 200 from moving in the plane parallel to the base plate 110. In this embodiment, the positioning rib 150 extends like a stripe on the plane of the base plate 110, and is arranged between the first drive wheel 300 and the second drive wheel 400 and spaces the first drive wheel 300 apart from the second drive wheel 400. A gap is defined between each of both ends of the positioning rib 150 and the side wall 120. A connecting component 500 may pass through the gap and may be hence entirely wound on the first drive wheel 300 and the second drive wheel 400. The positioning groove 230 corresponds to the positioning rib 150, and extends to pass through the baffle 200 along an orientation parallel to the orientation of the first drive wheel 300 towards the second drive wheel 400. With the positioning groove 230, two wing portions 240 are defined at an end, proximal to the second drive wheel 400, of the baffle 200. The positioning rib 150 is inserted into the positioning groove 230, and is abutted against to a wall portion, distal from the second drive wheel 400, of the positioning groove 230. Hence, the positioning rib 150 cooperates with the part enclosing at the outer periphery of the first drive wheel 300 to constrain the baffle 200 between profiles enclosed thereby. In this way, the baffle 200 is prevented from moving in the plane parallel to the base plate 110.

Further, referring to FIG. 6 and FIG. 7, the distance measuring device 10B further includes a mounting plate 430 to prevent external foreign matters from entering the receiving slot from the gap between the second drive wheel 400 and the baffle 200 and the gap between the second drive wheel 400 and the side wall 120 to be hence wound on at least one of the first drive wheel 300, the second drive wheel 400, and the connecting component 500, such that the first drive wheel 300 and/or the second drive wheel 400 is locked. An end, distal from the base plate 110, of the second drive wheel 400, extends out of the receiving slot. The mounting plate 430 is entirely in a flat cylindrical plate-shaped structure, and is fixed to an end, distal from the base plate 110, of the second drive wheel 400, and entirely covers the gap between the second drive wheel 400 and the baffle 200 and the gap between the second drive wheel 400 and the side wall 120. The mounting plate 430, the baffle 200, the side wall 120, and the base plate 110 collaboratively define a drive space entirely enclosing the first drive wheel 300, the second drive wheel 400, and the connecting component 500. In this case, it is hard for the foreign matters to enter the drive space. The ranging devices and the shroud 420 are all mounted at an end, distal from the base plate 110, of the mounting plate 430.

The distance measuring device 10B according to the embodiments of the present disclosure includes the base 100, the baffle 200, and the drive assembly. The base 100 includes the base plate 110. The base plate 110 is arranged opposite to the baffle 200, and the baffle 200 covers part of the base plate 110. The drive assembly includes the first drive wheel 300 rotatably mounted on the base plate 110. The first drive wheel 300 is a driving wheel, and is capable of rotating under driving by an external driving device, and hence drives the ranging devices to rotate. The base 100 further includes the side wall 120. The side wall 120 at least partially encloses an outer periphery of the first drive wheel 300, the baffle 200 is attached to a part of the side wall 120 enclosing the outer periphery of the first drive wheel 300, and the base plate 110, the baffle 200, and the side wall 120 collaboratively enclose the first drive wheel 300. In addition, it is hard for the external foreign matters to enter the space defined by the base plate 110, the baffle 200, and the side wall 120 and be wound on the first drive wheel 300. In this way, the technical problem that the driving wheel locked by the foreign matters wound thereon is addressed.

It should be understood that even if in this embodiment, the side wall 120 and the base plate 110 are integrally arranged, the present disclosure is not limited to such configuration. In other embodiments of the present disclosure, the side wall 120 may also be integrally arranged with the baffle 200, and the side wall 120 extends from the baffle 200 to the base plate 110. In this case, the base 100 still includes the base plate 110, and the side wall 120 extending from the base plate 110 to the baffle 200.

In addition, some improvements may also be made to the baffle 200 on the basis of the distance measuring device 10B according to this embodiment, such that positioning between the baffle 200 and the side wall 120 is not practiced by a groove. Instead, the baffle 200 is positioned in the plane parallel to the base plate 110 by cooperation between the positioning rib on the base plate 110 and the side wall enclosing the outer periphery of the first drive wheel. Further, the baffle 200 and the base 100 are fixed by a threaded fastener. The specific improvements are similar to the distance measuring device 700 as illustrated in FIG. 8, which are not described herein any further.

Based on the same inventive concept, the present disclosure further provides distance measuring devices in some other embodiments. These distance measuring devices are similar to the distance measuring device in the first embodiment or the second embodiment. The distance measuring devices according to these embodiments are described hereinafter, and in particular, main differences of the distance measuring devices according to these embodiments relative to the distance measuring device in the first embodiment or the second embodiment are described.

Figure 9:
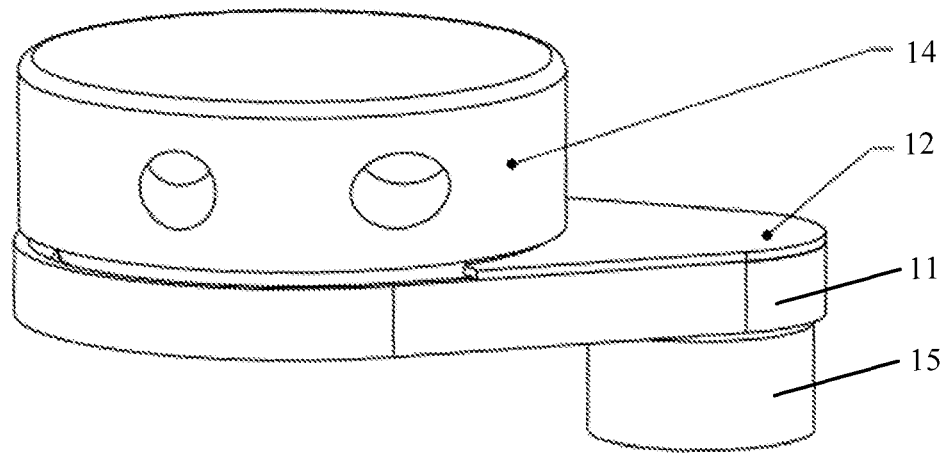
FIG. 9 is a schematic perspective view of a distance measuring device according to a third embodiment of the present disclosure.
Figure 10:
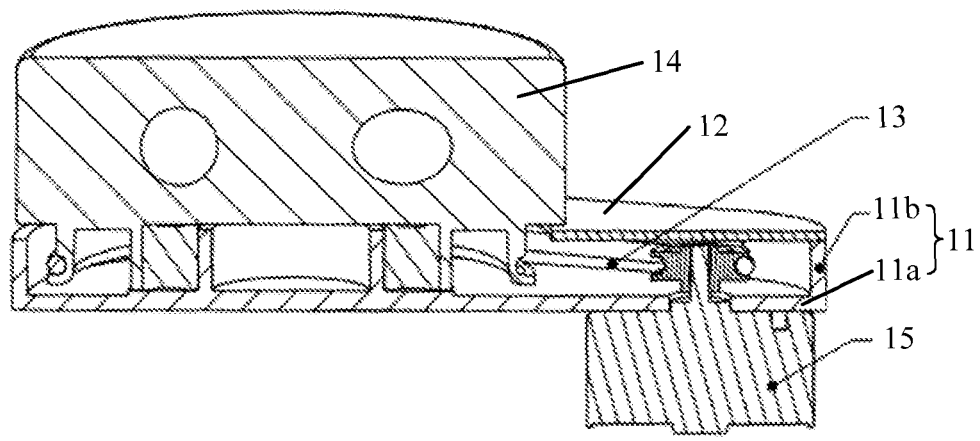
FIG. 10 is a schematic sectional view of the distance measuring device in FIG. 9.

FIG. 9 and FIG. 10 illustrate a distance measuring device according to a third embodiment of the present disclosure. The distance measuring device mainly includes a base 11, a baffle 12, a drive assembly 13, a ranging component 14, and a driving component 15. The base 11 includes a base plate 11a and a side wall lib. The side wall lib may be formed by extending the base plate 11a, or may be a side wall mounted on the base plate 11a. The baffle 12 and the base 11 define a mounting chamber. The drive assembly 13 is arranged in the mounting chamber. The ranging component 14 is connected to the drive assembly 13, and driven by the drive assembly 13 to rotate. The driving component 15 is connected to the drive assembly 13 to transmit, by the drive assembly 13, a driving force to the ranging component 14. In a region outside a periphery of the ranging component 14, the baffle 12 completely covers the base 11. The ranging component 14, and the driving component 15 may be further mounted on the base 11. It should be noted that the mounting chamber herein may refer to a space between the baffle 12 and the base plate 11a. For example, any space that is over the base plate 11a and whose height is less than the baffle 12 may be referred to as the mounting chamber formed between the baffle 12 and the base 11.

In some embodiments, the base 11, the baffle 12, the drive assembly 13, the ranging component 14, and the driving component 15 are respectively the same as or similar to the base, the baffle, the drive assembly, the ranging component, and the driving component of the distance measuring device in the first embodiment or the second embodiment, which are not detailed herein any further.

A major difference between the distance measuring device according to the third embodiment and the distance measuring device according to the first embodiment or the second embodiment lies in that: in the third embodiment, the baffle 12 is mounted on the end surface, distal from the base plate 11a, of the side wall 11b; that is, a surface of the baffle 12 facing towards the base plate 11a is attached to a top face of the side wall 11b. In this manner, the side wall 11b may achieve the effect of the limiting rib.

In some embodiments, as illustrated in FIG. 9 and FIG. 10, the side wall 11b may be a complete side wall, that is, the side wall 11b extends towards a side facing towards the baffle 12, and extended side wall segments have an approximately uniform height. In this way, in a region outside a periphery of the ranging component 14, the baffle 12 and the base 11 define a closed mounting chamber. In the embodiment, foreign matters are effectively prevented from entering the mounting chamber, and hence are prevented from intruding into the drive assembly 13.

Figure 14:
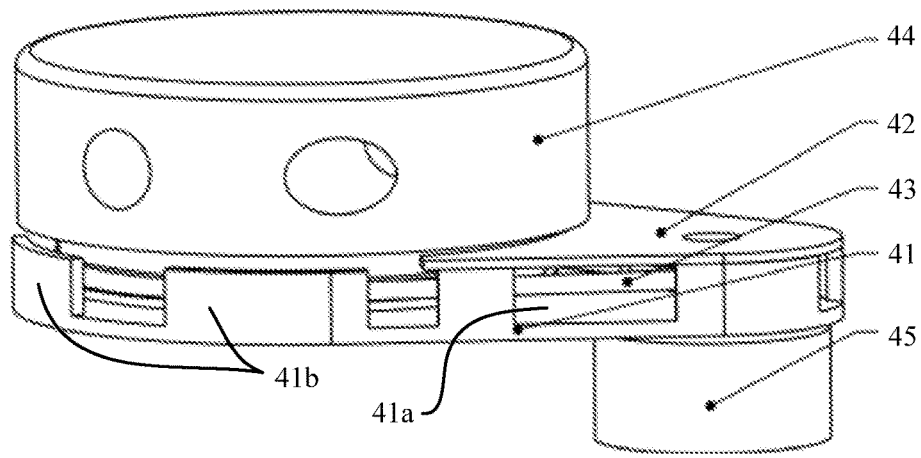
FIG. 14 is a schematic perspective view of a distance measuring device according to a sixth embodiment of the present disclosure.

In some other embodiments, the side wall 11b may be a side wall having a notch. For example, the side wall 11b may extend towards a side facing towards the baffle 12, extended side wall segments may have an approximately uniform height, and the notch (referring to the side wall 41b as illustrated in FIG. 14) is arranged between each two adjacent side wall segments; or, the notch may be one or more holes formed in the complete side wall. In addition, these notches may be uniformly or non-uniformly distributed on the side wall 11b. As such, the baffle 12, the base 11, and the side wall 11b may define a semi-closed mounting chamber.

Figure 11:
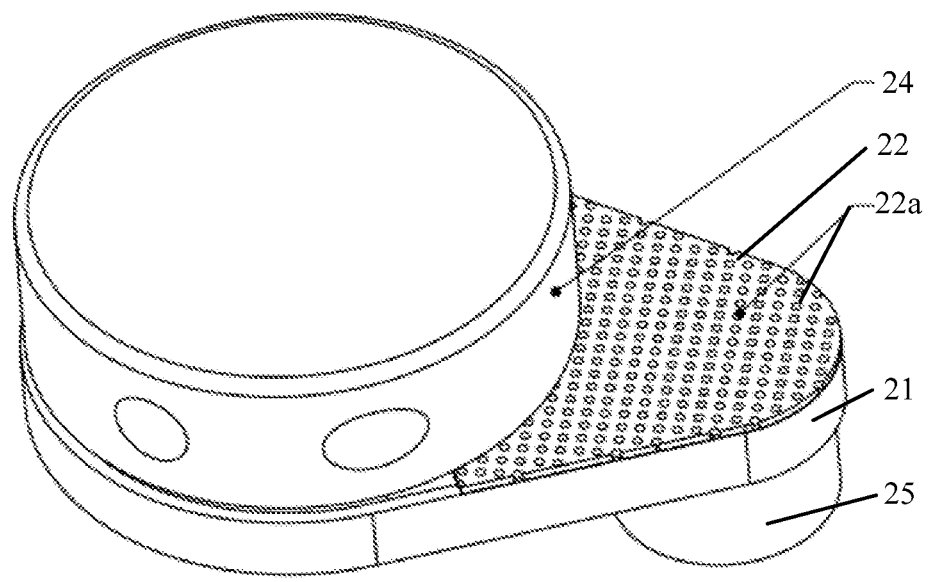
FIG. 11 is a schematic perspective view of a distance measuring device according to a fourth embodiment of the present disclosure.
Figure 12:
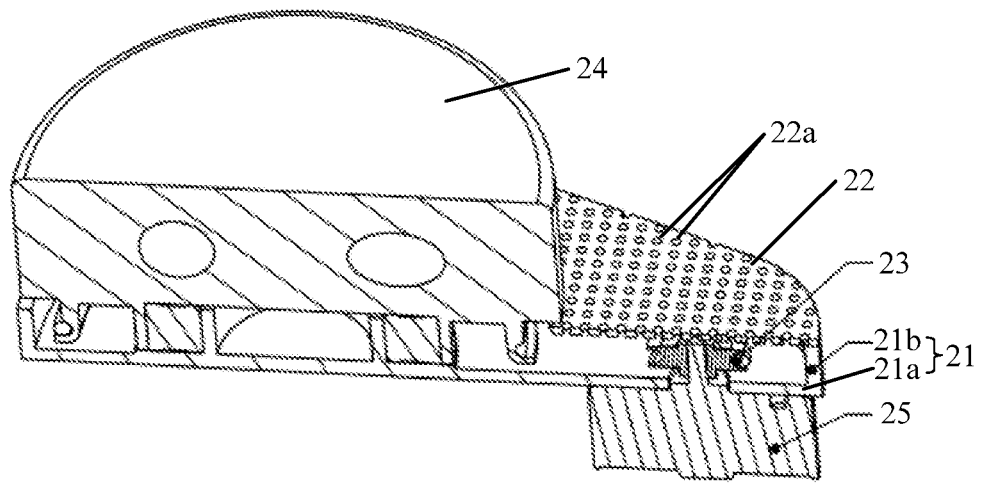
FIG. 12 is a schematic sectional view of the distance measuring device in FIG. 11.

In some embodiments, a plurality of holes may be arranged on the baffle 12 (referring to the hole 22a as illustrated in FIG. 11 and FIG. 12). The hole is configured to prevent foreign matters greater than the hole from intruding into the drive assembly 13.

FIG. 11 and FIG. 12 illustrate a distance measuring device according to a fourth embodiment of the present disclosure. The distance measuring device mainly includes a base 21, a baffle 22, a drive assembly 23, a ranging component 24, and a driving component 25. The base 21 includes a base plate 21a and a side wall 21b. The side wall 21b may be formed by extending the base plate 21a, or be may be independent of the base plate 21a and fixedly connected to one end of the base plate 21a. The baffle 22 is arranged over the base plate 21a. The baffle 22 and the base 21 define a mounting chamber. The drive assembly 23 is arranged in the mounting chamber. The ranging component 24 is connected to the drive assembly 23, and driven by the drive assembly 23 to rotate. The driving component 25 is connected to the drive assembly 23 to transmit, by the drive assembly 23, a driving force to the ranging component 24. The ranging component 24, and the driving component 25 may be further mounted on the base 21. It should be noted that the mounting chamber herein may refer to a space between the baffle 22 and the base plate 21a. For example, any space that is over the base plate 21a and whose height is less than the baffle 22 may be referred to as the mounting chamber formed between the baffle 22 and the base 21.

In some embodiments, the base 21, the baffle 22, the drive assembly 23, the ranging component 24, and the driving component 25 are respectively the same as or similar to the base, the baffle, the drive assembly, the ranging component, and the driving component of the distance measuring device in the first embodiment or the second embodiment, which are not detailed herein any further.

A major difference between the distance measuring device according to the fourth embodiment and the distance measuring device according to the first embodiment or the second embodiment lies in that: in the fourth embodiment, a plurality of holes 22a are arranged on the baffle 22, wherein the holes 22a are configured to block foreign matters greater than the holes 22a from intruding into the drive assembly 23. These holes 22a may have the same size, and may be distributed in a row or column; or, these holes 22a may not have the same size. For example, a material of the baffle 22 may be plastic, metal, or fiber.

In some embodiments, as illustrated in FIG. 11 and FIG. 12, the side wall 21b may be a complete side wall, that is, the side wall 21b extends towards a side facing towards the baffle 22, and extended side wall segments have an approximately uniform height. In this way, in a region outside a periphery of the ranging component 14, the baffle 22 and the base 21 define a closed mounting chamber. In the embodiment, foreign matters greater than the hole 22a are effectively prevented from entering the mounting chamber, and hence are prevented from intruding into the drive assembly 23.

In some other embodiments, the side wall 21b may be a side wall having a notch. For example, the side wall 21b may extend towards a side facing towards the baffle 22, extended side wall segments may have an approximately uniform height, and the notch (referring to the side wall 41b as illustrated in FIG. 14) is arranged between each two adjacent side wall segments; or, the notch may be one or more holes formed in the complete side wall. In addition, these notches may be uniformly or non-uniformly distributed on the side wall 11b.

In some embodiments, as illustrated in FIG. 11 and FIG. 12, in a region outside a periphery of the ranging component 24, the baffle 22 completely covers the base plate 21a; that is, an entire profile edge of the baffle 22 may completely cover the base plate 21a in the region outside the periphery of the ranging component 24. For example, when the baffle 22 is attached to an inner side edge of the side wall 21b, the entire profile edge of the baffle 22 completely covers a corresponding part of the base plate 21a; and when the baffle 22 is attached to an end surface of the side wall 21b, the entire profile edge of the baffle 22 completely covers the corresponding part of the base plate 21a, and the corresponding part of base 21.

In other embodiments, in a region outside a periphery of the ranging component 24, the baffle 22 may partially cover the base plate 21a. For example, the entire profile edge of the baffle 22 partially covers the base plate 21a or the base 21 in the region outside the periphery of the ranging component 24. For example, the baffle covers only a part of the first drive wheel (referring to the first drive wheel 300 as illustrated in FIG. 2) in the drive assembly 23, or exposes a space between the first drive wheel in the drive assembly 23, and the portion, distal from the ranging component 24, of the side wall 21b.

Figure 13:
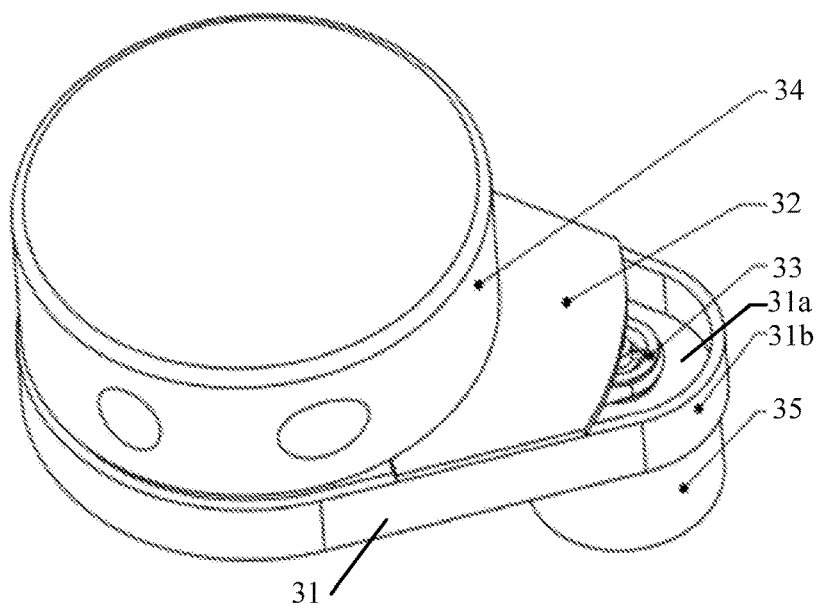
FIG. 13 is a schematic perspective view of a distance measuring device according to a fifth embodiment of the present disclosure.

FIG. 13 illustrates a distance measuring device according to a fifth embodiment of the present disclosure. The distance measuring device mainly includes a base 31, a baffle 32, a drive assembly 33, a ranging component 34, and a driving component 35. The base 31 includes a base plate 31a and a side wall 31b. The side wall 31b may be formed by extending the base plate 31a, or be may be independent of the base plate 31a and fixedly connected to one end of the base plate 31a. The baffle 32 is arranged over the base plate 31a. The baffle 32 and the base 31 define a mounting chamber. The drive assembly 33 is arranged in the mounting chamber. The ranging component 34 is connected to the drive assembly 33, and driven by the drive assembly 33 to rotate. The driving component 35 is connected to the drive assembly 33 to transmit, by the drive assembly 33, a driving force to the ranging component 34. The ranging component 34, and the driving component 35 may be further mounted on the base 31. It should be noted that the mounting chamber herein may refer to a space between the baffle 32 and the base plate 31a. For example, any space that is over the base plate 31a and whose height is less than the baffle 32 may be referred to as the mounting chamber formed between the baffle 32 and the base 31.

In some embodiments, the base 31, the baffle 32, the drive assembly 33, the ranging component 34, and the driving component 35 are respectively the same as or similar to the base, the baffle, the drive assembly, the ranging component, and the driving component of the distance measuring device in the first embodiment or the second embodiment, which are not detailed herein any further.

A major difference between the distance measuring device according to the fifth embodiment and the distance measuring device according to the first embodiment or the second embodiment lies in that: in the fifth embodiment, in the region outside the periphery of the ranging component 34, the baffle 32 is further configured to partially cover the base plate 31a or the base 31. For example, the entire profile edge of the baffle 32 partially covers the base plate 31a or the base 31 in the region outside the periphery of the ranging component 34. For example, the baffle 32 covers only a part of the first drive wheel (referring to the first drive wheel 300 as illustrated in FIG. 2) in the drive assembly 33, and in particular cover a connecting portion (or an engaging portion) between the first drive wheel and a connecting component (referring to the connecting component 500 as illustrated in FIG. 2) from above to prevent foreign objects from intruding. Alternatively, the baffle 32 may expose a space between the first drive wheel in the drive assembly 33, and the portion, distal from the ranging component 34, of the side wall 31b.

In some embodiments, as illustrated in FIG. 13, the side wall 31b may be a complete side wall, that is, the side wall 31b extends towards a side facing towards the baffle 32, and extended side wall segments have an approximately uniform height. In this way, in the region outside the periphery of the ranging component 34, the baffle 12 and the base 31 define a semi-closed mounting chamber. In this way, foreign matters over the baffle 32 are prevented from intruding into the drive assembly 33.

In some other embodiments, the side wall 31b may be a side wall having a notch. For example, the side wall 31b may extend towards a side facing towards the baffle 32, extended side wall segments may have an approximately uniform height, and the notch (referring to the side wall 41b as illustrated in FIG. 14) is arranged between each two adjacent side wall segments; or, the notch may be one or more holes formed in the complete side wall. In addition, these notches may be uniformly or non-uniformly distributed on the side wall 31b.

FIG. 14 illustrates a distance measuring device according to a sixth embodiment of the present disclosure. The distance measuring device mainly includes a base 41, a baffle 42, a drive assembly 43, a ranging component 44, and a driving component 45. The base 41 includes a base plate 41a and a side wall 41b. The side wall 41b may be formed by extending the base plate 41a, or be may be independent of the base plate 41a and fixedly connected to one end of the base plate 41a. The baffle 42 is arranged over the base plate 41a. The baffle 42 and the base 41 define a mounting chamber. The drive assembly 43 is arranged in the mounting chamber. The ranging component 44 is connected to the drive assembly 43, and driven by the drive assembly 43 to rotate. The driving component 45 is connected to the drive assembly 43 to transmit, by the drive assembly 43, a driving force to the ranging component 44. The ranging component 44, and the driving component 45 may be further mounted on the base 41. It should be noted that the mounting chamber herein may refer to a space between the baffle 42 and the base plate 41a. For example, any space that is over the base plate 41a and whose height is less than the baffle 42 may be referred to as the mounting chamber formed between the baffle 42 and the base 41.

In some embodiments, the base 41, the baffle 42, the drive assembly 43, the ranging component 44, and the driving component 45 are respectively the same as or similar to the base, the baffle, the drive assembly, the ranging component, and the driving component of the distance measuring device in the first embodiment or the second embodiment, which are not detailed herein any further.

A major difference between the distance measuring device according to the sixth embodiment and the distance measuring device according to the first embodiment or the second embodiment lies in that: in the sixth embodiment, the side wall 41b is further configured to a side wall having a notch. For example, the side wall 41b may extend towards a side facing towards the baffle 42, extended side wall segments may have an approximately uniform height, and the notch is arranged between each two adjacent side wall segments; or, the notch may be one or more holes formed in the complete side wall. In addition, these notches may be uniformly or non-uniformly distributed on the side wall 41b.

In some embodiments, as illustrated in FIG. 14, in a region outside a periphery of the ranging component 44, the baffle 42 completely covers the base plate 41a or the base 41; that is, an entire profile edge of the baffle 42 may completely cover the base plate 41a or the base 41 in the region outside the periphery of the ranging component 44.

In other embodiments, in a region outside a periphery of the ranging component 44, the baffle 42 may partially cover the base plate 41a or the base 41. For example, the entire profile edge of the baffle 42 partially covers the base plate 41a or the base 41 in the region outside the periphery of the ranging component 44. For example, the baffle covers only a part of the first drive wheel (referring to the first drive wheel 300 as illustrated in FIG. 2) in the drive assembly 43, or exposes a space between the first drive wheel in the drive assembly 43, and the portion, distal from the ranging component 44, of the side wall 41b.

Figure 15:
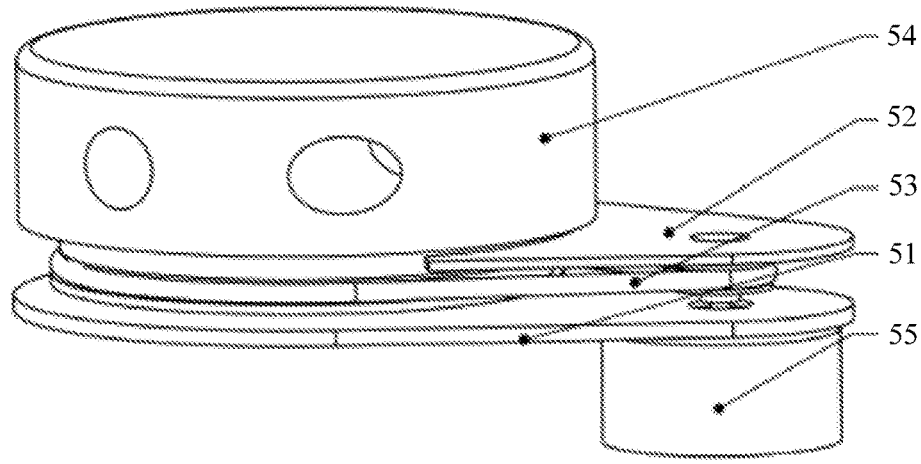
FIG. 15 is a schematic perspective view of a distance measuring device according to a seventh embodiment of the present disclosure.

FIG. 15 illustrates a distance measuring device according to a seventh embodiment of the present disclosure. The distance measuring device mainly includes a base 51, a baffle 52, a drive assembly 53, a ranging component 54, and a driving component 55. The baffle 52 is arranged over the base 51. The baffle 52 and the base 51 define a mounting chamber. The drive assembly 53 is arranged in the mounting chamber. The ranging component 54 is connected to the drive assembly 53, and driven by the drive assembly 53 to rotate. The driving component 55 is connected to the drive assembly 53 to transmit, by the drive assembly 53, a driving force to the ranging component 54. The ranging component 54, and the driving component 55 may be further mounted on the base 51. It should be noted that the mounting chamber herein may refer to a space between the baffle 52 and the base plate 51a. For example, any space that is over the base plate 51a and whose height is less than the baffle 52 may be referred to as the mounting chamber formed between the baffle 52 and the base 51.

In some embodiments, the baffle 52, the drive assembly 53, the ranging component 54, and the driving component 55 are respectively the same as or similar to the baffle, the drive assembly, the ranging component, and the driving component of the distance measuring device in the first embodiment or the second embodiment, which are not detailed herein any further.

A major difference between the distance measuring device according to the seventh embodiment and the distance measuring device according to the first embodiment or the second embodiment lies in that: in the seventh embodiment, the base 51 is only a plate-like body, the baffle 52 is arranged over the base 51, and the baffle 52 and the base 51 define a mounting chamber having an opening in a periphery thereof. For example, the baffle 52 may be mounted over the base 51 by the latch 210, the limiting rib 130, the positioning rib 150 or the like structures according to the first embodiment or the second embodiment. By this design, foreign matters over the baffle 52 are prevented from intruding into the drive assembly 53.

In some embodiments, as illustrated in FIG. 15, in a region outside a periphery of the ranging component 54, the baffle 52 completely covers the base 51; that is, an entire profile edge of the baffle 52 may completely cover the base 51 in the region outside the periphery of the ranging component 54.

In other embodiments, in a region outside a periphery of the ranging component 54, the baffle 52 may partially cover the base 51. For example, the entire profile edge of the baffle 52 partially covers the base 51 in the region outside the periphery of the ranging component 54. For example, the baffle covers only a part of the first drive wheel (referring to the first drive wheel 300 as illustrated in FIG. 2) in the drive assembly 53, or exposes a part of the base 51 on a side, distal from the ranging component 54, of the first drive wheel in the drive assembly 53.

Figure 16:
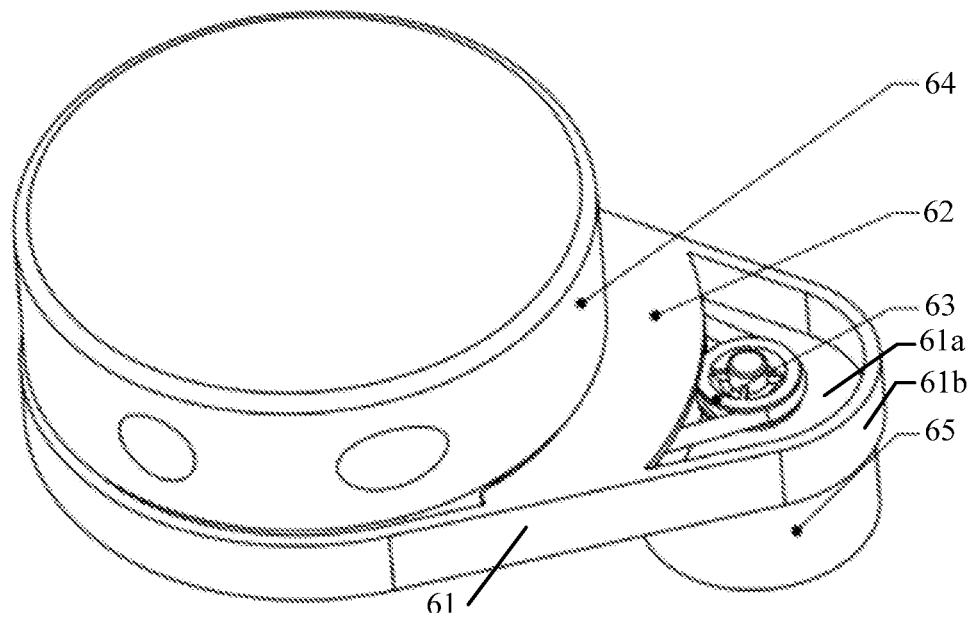
FIG. 16 is a schematic perspective view of a distance measuring device according to an eighth embodiment of the present disclosure.

FIG. 16 illustrates a distance measuring device according to an eighth embodiment of the present disclosure. The distance measuring device mainly includes a base 61, a baffle 62, a drive assembly 63, a ranging component 64, and a driving component 65. The base 61 includes a base plate 61a. The baffle 62 is arranged over the base plate 61a, and the baffle 62 and the base 61 define a mounting chamber. The drive assembly 63 is arranged in the mounting chamber. The ranging component 64 is connected to the drive assembly 63, and driven by the drive assembly 63 to rotate. The driving component 65 is connected to the drive assembly 63 to transmit, by the drive assembly 63, a driving force to the ranging component 64. The ranging component 64, and the driving component 65 may be further mounted on the base 61. It should be noted that the mounting chamber herein may refer to a space between the baffle 62 and the base plate 61a. For example, any space that is over the base plate 61a and whose height is less than the baffle 62 may be referred to as the mounting chamber formed between the baffle 62 and the base 61.

In some embodiments, the base 61, the drive assembly 63, the ranging component 64, and the driving component 65 are respectively the same as or similar to the base, the drive assembly, the ranging component, and the driving component of the distance measuring device in the first embodiment or the second embodiment, which are not detailed herein any further.

A major difference between the distance measuring device according to the eighth embodiment and the distance measuring device according to the first embodiment or the second embodiment lies in that: in the eighth embodiment, the base 61 and the baffle 62 are in an integral structure.

In some embodiments, as illustrated in FIG. 16, the side wall 61b may be a complete side wall, that is, the side wall 61b extends towards a side facing towards the baffle 62, and extended side wall segments have an approximately uniform height. In this way, in the region outside the periphery of the ranging component 64, the baffle 62 and the base 61 define a closed or semi-closed mounting chamber. In this way, foreign matters over the baffle 62 are prevented from intruding into the drive assembly 63.

In some other embodiments, the side wall 61b may be a side wall having a notch. For example, the side wall 61b may extend towards a side facing towards the baffle 62, extended side wall segments may have an approximately uniform height, and the notch (referring to the side wall 41b as illustrated in FIG. 14) is arranged between each two adjacent side wall segments; or, the notch may be one or more holes formed in the complete side wall. In addition, these notches may be uniformly or non-uniformly distributed on the side wall 11b.

In some other embodiments, as illustrated in FIG. 16, in a region outside a periphery of the ranging component 64, the baffle 62 may partially cover the base 61. For example, the entire profile edge of the baffle 62 partially covers the base 61 in the region outside the periphery of the ranging component 64. For example, the baffle covers only a part of the first drive wheel (referring to the first drive wheel 300 as illustrated in FIG. 2) in the drive assembly 63, or exposes a part of the base 61 on a side, distal from the ranging component 64, of the first drive wheel in the drive assembly 63.

In some other embodiments, in a region outside a periphery of the ranging component 64, the baffle 62 completely covers the base 61. That is, an entire profile edge of the baffle 62 may completely cover the base 61 in the region outside the periphery of the ranging component 64.

Figure 17:
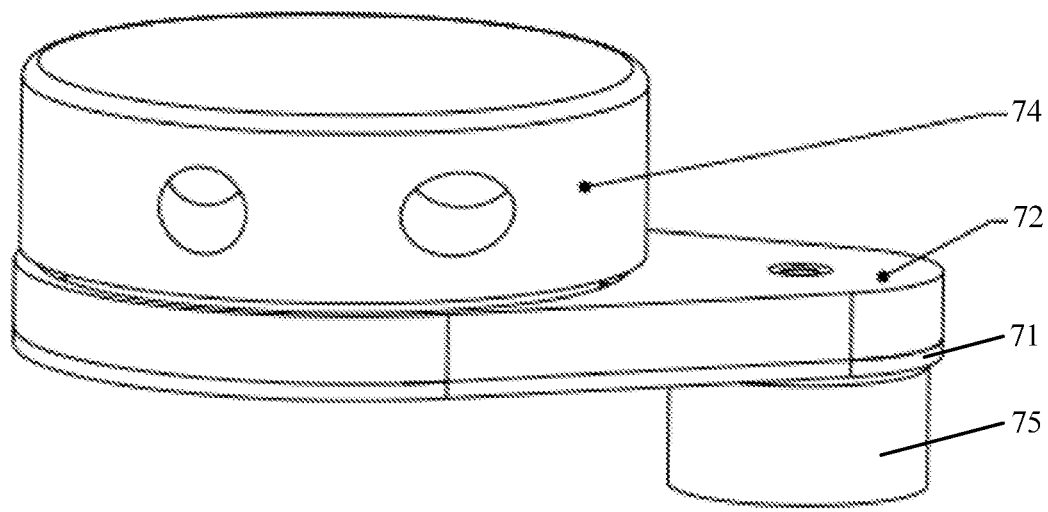
FIG. 17 is a schematic perspective view of a distance measuring device according to a ninth embodiment of the present disclosure.
Figure 18:
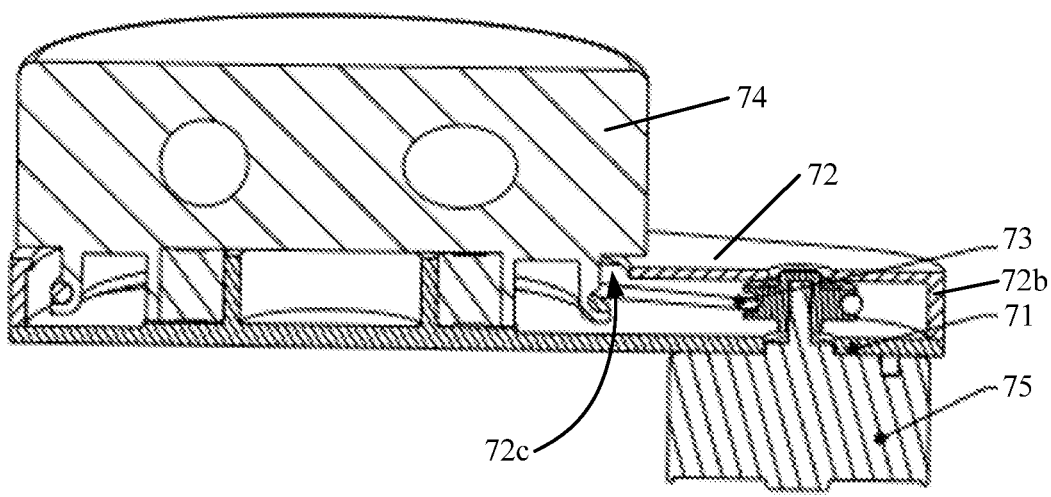
FIG. 18 is a schematic sectional view of the distance measuring device in FIG. 17.

FIG. 17 and FIG. 18 illustrate a distance measuring device according to a ninth embodiment of the present disclosure. The distance measuring device mainly includes a base 71, a baffle 72, a drive assembly 73, a ranging component 74, and a driving component 75. The base 71 is a plate-like body. The baffle 72 is arranged over the base 71, and the baffle 72 and the base 71 define a mounting chamber. The drive assembly 73 is arranged in the mounting chamber. The ranging component 74 is connected to the drive assembly 73, and driven by the drive assembly 73 to rotate. The driving component 75 is connected to the drive assembly 73 to transmit, by the drive assembly 73, a driving force to the ranging component 74. The ranging component 74, and the driving component 75 may be further mounted on the base 71. It should be noted that the mounting chamber herein may refer to a space between the baffle 72 and the base 71. For example, any space that is over the base 71 and whose height is less than the baffle 72 may be referred to as the mounting chamber formed between the baffle 72 and the base 71.

In some embodiments, the baffle 72, the drive assembly 73, the ranging component 74, and the driving component 75 are respectively the same as or similar to the baffle, the drive assembly, the ranging component, and the driving component of the distance measuring device in the first embodiment or the second embodiment, which are not detailed herein any further.

A major difference between the distance measuring device according to the ninth embodiment and the distance measuring device according to the first embodiment or the second embodiment lies in that: in the ninth embodiment, the base 71 is only a plate-like body, a periphery of the baffle 72 is provided with a side wall 72b extending towards a side facing towards the base 71, the baffle is provided with a perforation 72c, and the ranging component 74 is connected to the drive assembly 73 by the perforation 72c. By this design, the foreign matters are prevented from intruding into the drive assembly 73.

In some embodiments, as illustrated in FIG. 17 and FIG. 18, the side wall 72b may be a complete side wall. That is, the side wall 72b extends towards a side facing towards the base 71, and extended side wall segments have an approximately uniform height. In this way, in a region outside a periphery of the ranging component 74, the baffle 72, the side wall 72b, and the base 71 define a closed mounting chamber. In this embodiment, foreign matters are effectively prevented from entering the mounting chamber, and hence are prevented from intruding into the drive assembly 73.

In some other embodiments, the side wall 72b may be a side wall having a notch. For example, the side wall 72b may extend towards a side facing towards the base 71, extended side wall segments may have an approximately uniform height, and the notch is arranged between each two adjacent side wall segments; or, the notch may be one or more holes formed in the complete side wall. In addition, these notches may be uniformly or non-uniformly distributed on the side wall 72b.

In some embodiments, a plurality of holes may be arranged on the baffle 72 (referring to the hole 22a as illustrated in FIG. 11 and FIG. 12). The hole is configured to prevent foreign matters greater than the hole from intruding into the drive assembly 73. These holes may have the same size, and may be distributed in a row or column; or, these holes may not have the same size. For example, a material of the baffle 72 may be plastic, metal, or fiber.

Figure 19:
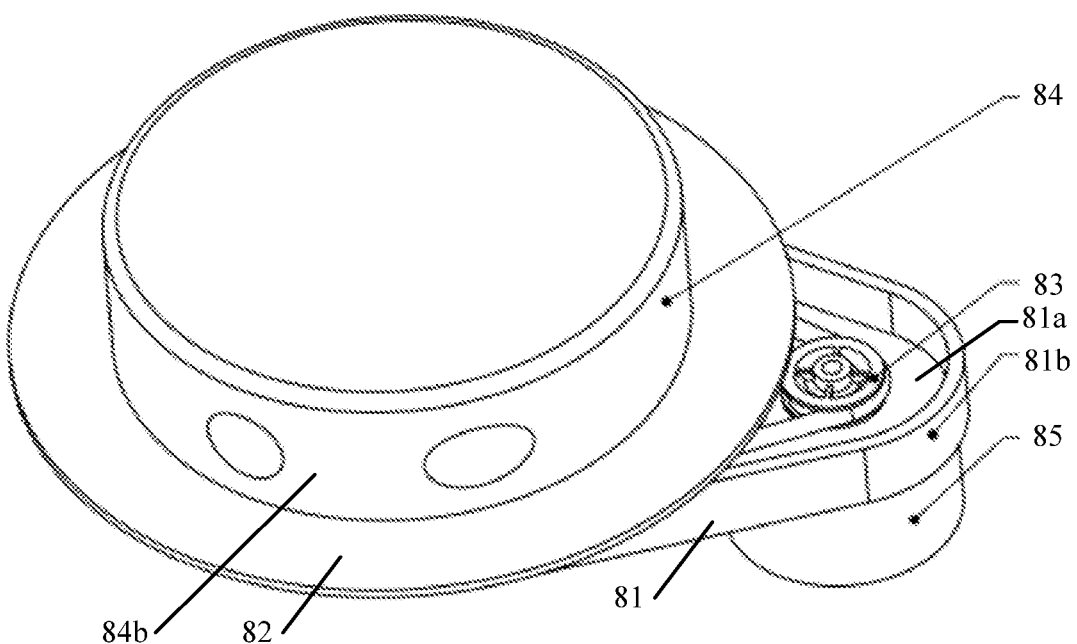
FIG. 19 is a schematic perspective view of a distance measuring device according to a tenth embodiment of the present disclosure.

FIG. 19 illustrates a distance measuring device according to a tenth embodiment of the present disclosure. The distance measuring device mainly includes a base 81, a baffle 82, a drive assembly 83, a ranging component 84, and a driving component 85. The base 81 includes a base plate 81a. The baffle 82 is arranged over the base plate 81a, and the baffle 82 and the base 81 define a mounting chamber. The drive assembly 83 is arranged in the mounting chamber. The ranging component 84 is connected to the drive assembly 83, and driven by the drive assembly 83 to rotate. The driving component 85 is connected to the drive assembly 83 to transmit, by the drive assembly 83, a driving force to the ranging component 84. The ranging component 84, and the driving component 85 may be further mounted on the base 81. It should be noted that the mounting chamber herein may refer to a space between the baffle 82 and the base 81. For example, any space that is over the base plate 81a and whose height is less than the baffle 82 may be referred to as the mounting chamber formed between the baffle 82 and the base 81.

In some embodiments, the base 81, the drive assembly 83, the ranging component 84, and the driving component 85 are respectively the same as or similar to the base, the drive assembly, the ranging component, and the driving component of the distance measuring device in the first embodiment or the second embodiment, which are not detailed herein any further.

A major difference between the distance measuring device according to the tenth embodiment and the distance measuring device according to the first embodiment or the second embodiment lies in that: in the tenth embodiment, the baffle 82 is connected to the ranging component 84. Accordingly, the baffle 82 is capable of rotating with the ranging component 84.

In some other embodiments, as illustrated in FIG. 19, the baffle 82 and a side wall 84b of the ranging component 84 are in an integral structure. Alternatively, the baffle 82 may be a separate member, which may be independently manufactured to, for example, an annular shape body, and mounted on the ranging component 84 by snapping, thread connection by a thread fastener, bonding by an adhesive, and ultrasonic connection.

In some other embodiments, as illustrated in FIG. 19, a periphery of the base plate 81a is provided with a side wall 81b extending towards the baffle 82. In addition, the side wall 81b may be a complete side wall. That is, the side wall 81b extends towards a side facing towards the baffle 82, and extended side wall segments have an approximately uniform height. In this way, in the region outside the periphery of the ranging component 84, the side wall 81b, and the base plate 81a define a closed or semi-closed mounting chamber. In the embodiment, foreign matters over the baffle 82 are effectively prevented from entering the mounting chamber, and hence are prevented from intruding into the drive assembly 83.

In some other embodiments, the side wall 81b may be a side wall having a notch. For example, the side wall 81b may extend towards a side facing towards the baffle 82, extended side wall segments may have an approximately uniform height, and the notch is arranged between each two adjacent side wall segments; or, the notch may be one or more holes formed in the complete side wall. In addition, these notches may be uniformly or non-uniformly distributed on the side wall 81b.

In summary, the distance measuring device according to the embodiments of the present disclosure may include a base, a baffle, a drive assembly, a ranging component, and a driving component. A periphery of the base is provided with a side wall, or with no side wall. The baffle is arranged over the base, and may prevent foreign matters over the baffle from intruding into the drive assembly. The baffle may be a portion extended upwards from the base, or may be arranged over the base in a mounting manner. The material of the baffle may be plastic, metal, cloth, net, and the like. The drive assembly may be a pulley with a belt, a gear, a chain with a sprocket, a link rod and the like; and a function of the drive assembly is to transmit power of the driving component to the ranging component. The ranging component is a distance measuring component for a rotary motion. The driving component and the ranging component are mounted on the base, and the drive assembly is arranged between the driving component and the ranging component. The baffle is arranged over the base, and defines a closed or a semi-closed mounting chamber with the base to block foreign matters from intruding into the drive assembly.

Figure 20:
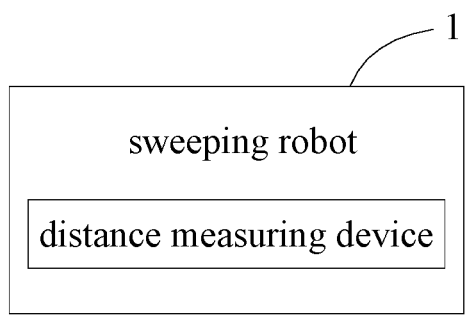
FIG. 20 is a schematic diagram of a sweeping robot according to one embodiment of the present disclosure.

Based on the same inventive concept, an embodiment of the present disclosure further provides a sweeping robot. Referring to FIG. 20, the sweeping robot 1 includes the distance measuring device according to any of the above embodiments. Therefore, the sweeping robot is capable of effectively preventing the drive assembly of the distance measuring device from being locked due to foreign matters wound thereon.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

What is claimed is:

1. A distance measuring device, comprising:
   a base, comprising a base plate;
   a baffle, arranged opposite to the base plate and covering part of the base plate, the baffle and the base defining a mounting chamber;
   a drive assembly, arranged in the mounting chamber;
   a ranging component, connected to the drive assembly, and driven by the drive assembly to rotate; and
   a driving component, connected to the drive assembly to transmit, by the drive assembly, a driving force to the ranging component;
   further comprising at least one limiting rib, wherein one end of the limiting rib is fixed to one of the base plate and the baffle, and the other end of the limiting rib is abutted against the other of the base plate and the baffle, such that the limiting rib supports the baffle,
   wherein the base further comprises a side wall extending towards the baffle; and
   the baffle is mounted to a part, distal from the base plate, of the side wall.

2. The distance measuring device according to claim 1, wherein the side wall is a complete side wall, or a side wall having a notch.

3. The distance measuring device according to claim 1, wherein in a region outside a periphery of the ranging component, the baffle completely or partially covers the base.

4. The distance measuring device according to claim 1, wherein a plurality of holes are defined in the baffle, the holes being configured to block foreign matters greater than the holes from intruding into the drive assembly.

5. The distance measuring device according to claim 1, wherein the base is a plate-like body, and the baffle and the base defines a mounting chamber having an opening in a periphery thereof.

6. The distance measuring device according to claim 1, wherein the base and the baffle are in an integral structure.

7. The distance measuring device according to claim 1, wherein the base is a plate-like body, and a periphery of the baffle is provided with a side wall extending towards the base.

8. The distance measuring device according to claim 7, wherein the baffle is provided with a perforation, and the ranging component is connected to the drive assembly via the perforation.

9. The distance measuring device according to claim 1, wherein the drive assembly comprises any one of a drive assembly using a pulley and a belt, a drive assembly using a gear, a drive assembly using a chain and a sprocket, and a drive assembly using a link rod.

10. The distance measuring device according to claim 1, wherein the drive assembly comprises a first drive wheel, wherein the first drive wheel is rotatably mounted on the base, and the baffle at least partially covers the first drive wheel.

11. The distance measuring device according to claim 10, wherein the drive assembly further comprises:
    a second drive wheel, rotatably mounted on the base, and the ranging component being connected to the second drive wheel; and
    a connecting component, wound on the first drive wheel and the second drive wheel, and configured to drive the second drive wheel to rotate as the first drive wheel rotates.

12. The distance measuring device according to claim 11, wherein the baffle at least partially covers the connecting component.

13. The distance measuring device according to claim 11, wherein the ranging component completely covers the second drive wheel.

14. The distance measuring device according to claim 1, wherein the ranging component comprises a lens, a laser generator, and a circuit board.

15. The distance measuring device according to claim 1, wherein the baffle is connected to the base by any one of: snapping, connection by a threaded fastener, bonding by an adhesive, and ultrasonic connection.

16. A distance measuring device, comprising:
    a base, comprising a base plate;
    a baffle, arranged opposite to the base and covering part of the base, the baffle and the base defining a mounting chamber; and
    a drive assembly, arranged in the mounting chamber;
    a ranging component, connected to the drive assembly, and driven by the drive assembly to rotate;
    further comprising at least one limiting rib, wherein one end of the limiting rib is fixed to one of the base plate and the baffle, and the other end of the limiting rib is abutted against the other of the base plate and the baffle, such that the limiting rib supports the baffle,
    wherein the base further comprises a side wall extending towards the baffle; and
    the baffle is mounted to a part, distal from the base plate, of the side wall.

17. A sweeping robot, comprising a distance measuring device;
- wherein the distance measuring device comprises:
- a base, comprising a base plate;
- a baffle, arranged opposite to the base plate and covering part of the base plate, the baffle and the base defining a mounting chamber;
- a drive assembly, arranged in the mounting chamber;
- a ranging component, connected to the drive assembly, and driven by the drive assembly to rotate; and
- a driving component, connected to the drive assembly to transmit, by the drive assembly, a driving force to the ranging component;
- the distance measuring device further comprising at least one limiting rib, wherein one end of the limiting rib is fixed to one of the base plate and the baffle, and the other end of the limiting rib is abutted against the other of the base plate and the baffle, such that the limiting rib supports the baffle;
- wherein the base further comprises a side wall extending towards the baffle; and
- the baffle is mounted to a part, distal from the base plate, of the side wall.

* * * * *